US010677981B2

(12) United States Patent
Di Trapani et al.

(10) Patent No.: US 10,677,981 B2
(45) Date of Patent: Jun. 9, 2020

(54) LARGE AREA LIGHT SOURCE AND LARGE AREA LUMINAIRE

(71) Applicant: COELUX S.R.L., Lomazzo (CO) (IT)

(72) Inventors: Paolo Di Trapani, Cavallasca (IT); Davide Magatti, Capiago Intimiano (IT); Antonio Lotti, Arcisate Varese (IT); Michael Ragan Krames, Mountain View, CA (US)

(73) Assignee: CoeLux S.r.l., Lomazzo (CO) (IT)

( * ) Notice: Subject to any disclaimer, the term of this patent is extended or adjusted under 35 U.S.C. 154(b) by 0 days.

(21) Appl. No.: 15/755,391

(22) PCT Filed: Aug. 28, 2015

(86) PCT No.: PCT/EP2015/069790
§ 371 (c)(1),
(2) Date: Feb. 26, 2018

(87) PCT Pub. No.: WO2017/036502
PCT Pub. Date: Mar. 9, 2017

(65) Prior Publication Data
US 2018/0246270 A1   Aug. 30, 2018

(51) Int. Cl.
*F21V 8/00* (2006.01)
*F21S 8/04* (2006.01)
(Continued)

(52) U.S. Cl.
CPC ............ *G02B 6/0078* (2013.01); *F21S 8/006* (2013.01); *F21S 8/04* (2013.01); *G02B 6/005* (2013.01);
(Continued)

(58) Field of Classification Search
CPC .......... F21S 8/006; F21S 8/04; G02B 6/0013; G02B 6/0051; G02B 6/0055; G02B 6/0073; G02B 6/0076; G02B 6/0078
See application file for complete search history.

(56) References Cited

U.S. PATENT DOCUMENTS 5,396,350 A * 3/1995 Beeson .................... F21V 5/02
349/62
8,068,285 B1   11/2011 Flynn
(Continued)

FOREIGN PATENT DOCUMENTS

CN   101657745 A   2/2010
CN   103649625 A   3/2014
(Continued)

OTHER PUBLICATIONS

T.C. Greenfell et al., "Representation of a non-spherical ice particle by a collection of independent spheres for scattering and absorption of radiation," Journal of Geophysical Research, vol. 104, No. D24, pp. 31,697-31,709 (13 total pages), Dec. 27, 1999.
(Continued)

*Primary Examiner* — Evan P Dzierzynski
*Assistant Examiner* — Keith G. Delahoussaye
(74) *Attorney, Agent, or Firm* — DiBerardino McGovern IP Group LLC

(57) ABSTRACT

A light source (25) for emitting collimated light (29) in particular for a large area luminaire (21) comprises a light guide unit (43) comprising a plurality of light guide strips (91) configured for guiding light received at the at least one lateral coupling face (47), for example, by total internal reflection. The light guide strips comprise a plurality of localized light source regions (57) at a main front face (55A) for having light pass there through, wherein the light source regions (57) are provided along the light guide strip (91) within a non-source region (59). The light source (25)
(Continued)

further comprising a plurality of light emitting units (41) for emitting light into the light guide strips (91) through respective portions of the at least one coupling face (47), and a collimation unit (45) extending along the main front face (55A) and comprising a plurality of collimating elements. Each collimating element comprises an input side and an output side, is optically associated to one of the plurality of light source regions (57), and is configured to receive light emerging from the associated light source region (57) at its input side and to emit collimated light (29) from a respective collimated light emitting region (61) formed at its output side.

31 Claims, 14 Drawing Sheets

(51) Int. Cl.
*F21S 8/00* (2006.01)
*F21Y 115/10* (2016.01)
*F21Y 113/13* (2016.01)

(52) U.S. Cl.
CPC ......... *G02B 6/0013* (2013.01); *G02B 6/0036* (2013.01); *G02B 6/0051* (2013.01); *G02B 6/0055* (2013.01); *G02B 6/0068* (2013.01); *G02B 6/0073* (2013.01); *G02B 6/0076* (2013.01); *F21Y 2113/13* (2016.08); *F21Y 2115/10* (2016.08)

(56) References Cited

U.S. PATENT DOCUMENTS

| | | | |
|---|---|---|---|
| 2005/0185416 A1* | 8/2005 | Lee | F21V 5/02 362/551 |
| 2006/0104081 A1 | 5/2006 | Fraval | |
| 2009/0086505 A1* | 4/2009 | Iwasaki | G02B 6/0041 362/612 |
| 2010/0046219 A1* | 2/2010 | Pijlman | G02B 6/0021 362/235 |
| 2011/0216542 A1* | 9/2011 | Di Trapani | G02B 6/001 362/311.01 |
| 2014/0063847 A1* | 3/2014 | Sakamoto | G02B 6/0031 362/609 |
| 2014/0160720 A1* | 6/2014 | Seuntiens | E04B 9/32 362/2 |
| 2014/0321113 A1 | 10/2014 | Onac et al. | |
| 2015/0049460 A1 | 2/2015 | David et al. | |
| 2016/0363777 A1 | 12/2016 | Flynn et al. | |
| 2017/0074486 A1 | 3/2017 | Flynn et al. | |

FOREIGN PATENT DOCUMENTS

| | | |
|---|---|---|
| DE | 102012215640 A1 | 3/2014 |
| GB | 2450192 C | 12/2005 |
| JP | 2006244779 A | 9/2006 |
| JP | 2010140912 A | 6/2010 |
| JP | 2010524184 A | 7/2010 |
| JP | 2011114086 A | 6/2011 |
| JP | 2011233508 A | 11/2011 |
| JP | 2012053988 A | 3/2012 |
| JP | 2014521124 A | 8/2014 |
| WO | 2008126011 A1 | 10/2008 |
| WO | 2009156347 A1 | 12/2009 |
| WO | 2009156348 A1 | 12/2009 |
| WO | 2013011481 A2 | 1/2013 |
| WO | 2013046081 A1 | 4/2013 |
| WO | 2014075721 A1 | 5/2014 |
| WO | 2014076218 A1 | 5/2014 |
| WO | 2014076656 A1 | 5/2014 |
| WO | 2015135560 A1 | 9/2015 |
| WO | 2015172794 A1 | 11/2015 |

OTHER PUBLICATIONS

Vincent Pernes and Adam Cohen, European International Searching Authority, International Search Report and Written Opinion, counterpart PCT Application No. PCT/EP2015/069790, dated Apr. 26, 2016, 20 pages total.
Standard Terminology of Appearance, ASTM International, Designation: E284-09a, downloaded Feb. 2012, pp. 1-23 (23 total pages).
DesignLights Consortium™ Product Qualification Criteria, Table 4: Primary Use Requirements, Sep. 1, 2015, 10 pages total.
Office Action, counterpart Japanese Patent Application No. 2018-529710, dated May 28, 2019, 21 pages total (including English translation of 11 pages).
Office Action, counterpart Chinese Patent Application No. 201580082759.1, dated Sep. 2, 2019, 13 pages total (including partial English translation of 4 pages).
Office Action, counterpart European Patent Application No. 15767430.0, dated Jan. 31, 2020, 5 pages total.

* cited by examiner

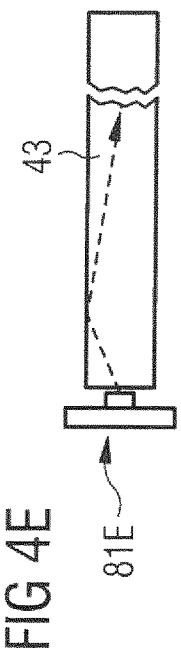 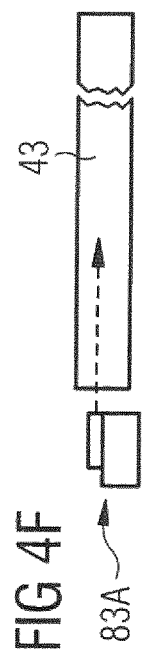  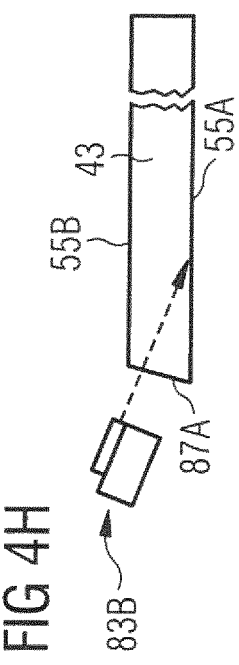 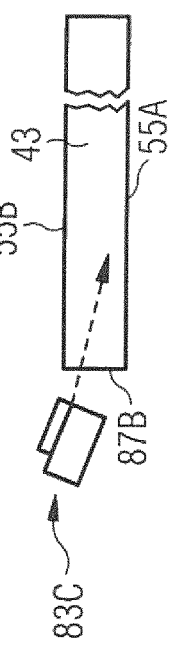
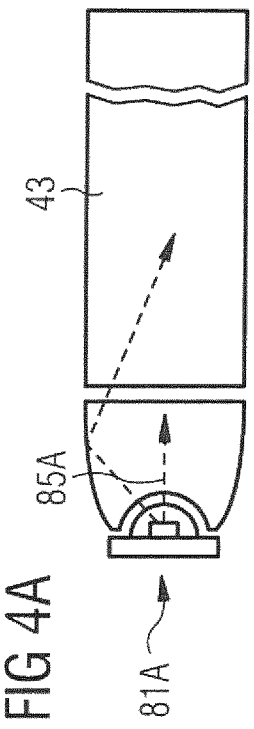 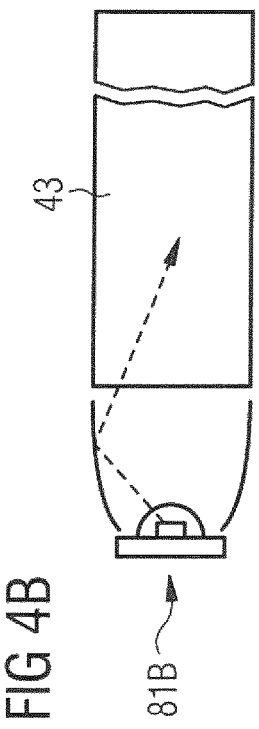 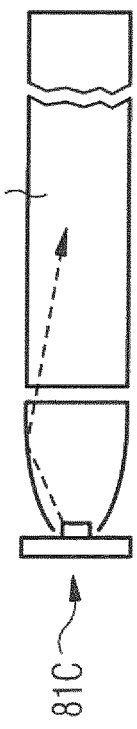 

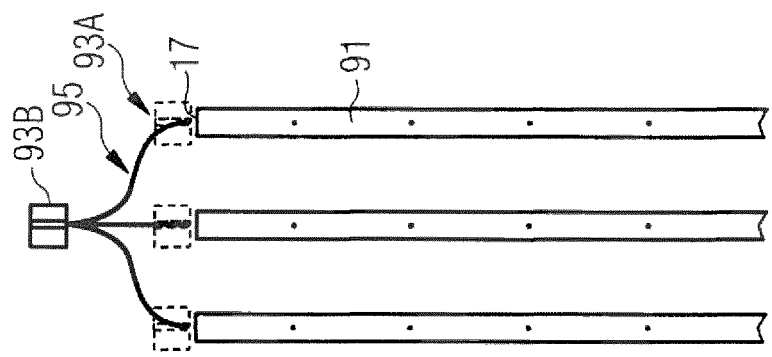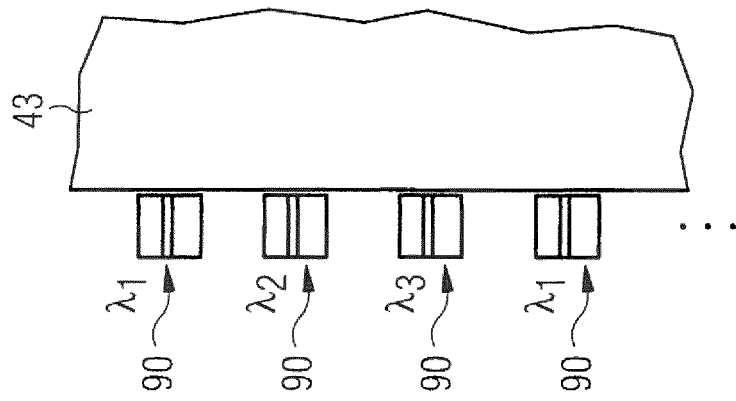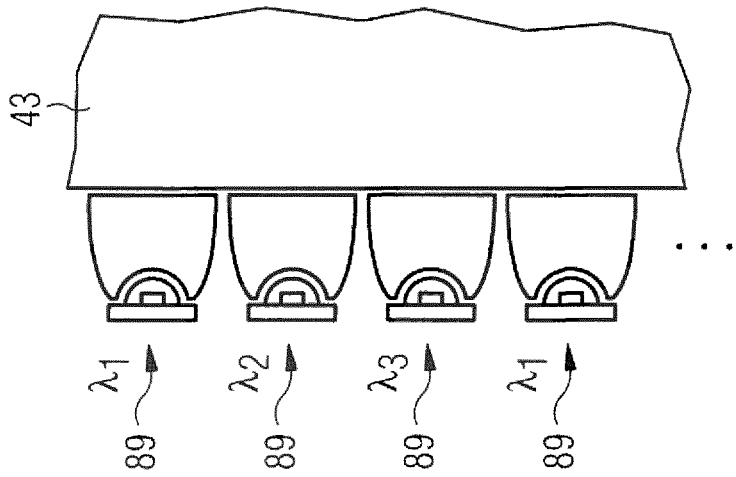

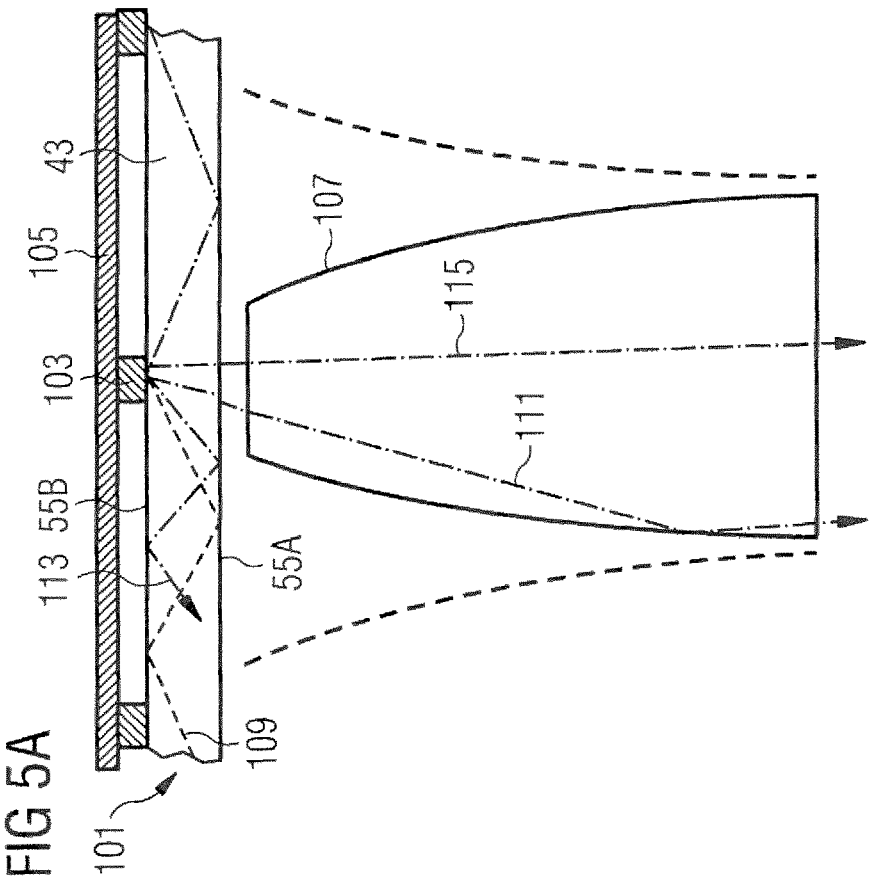
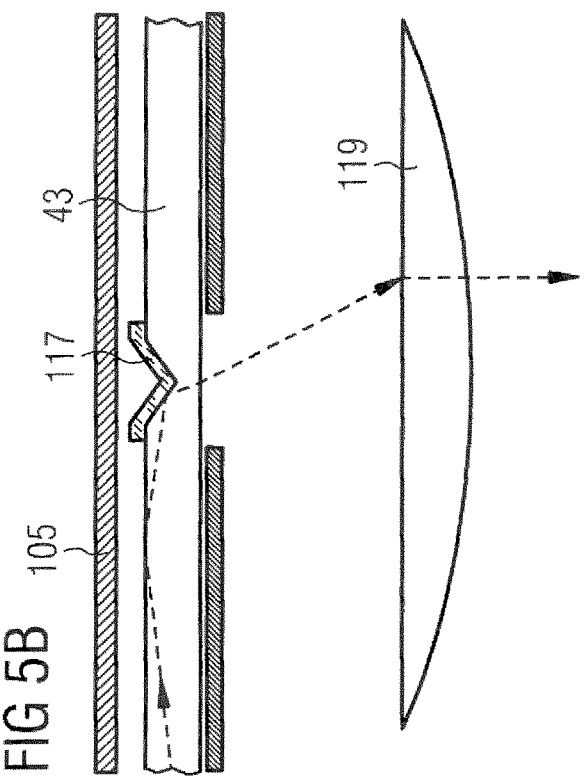
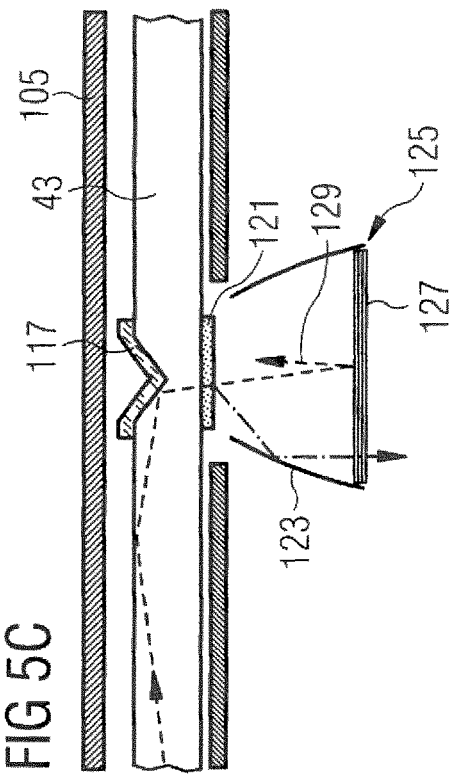

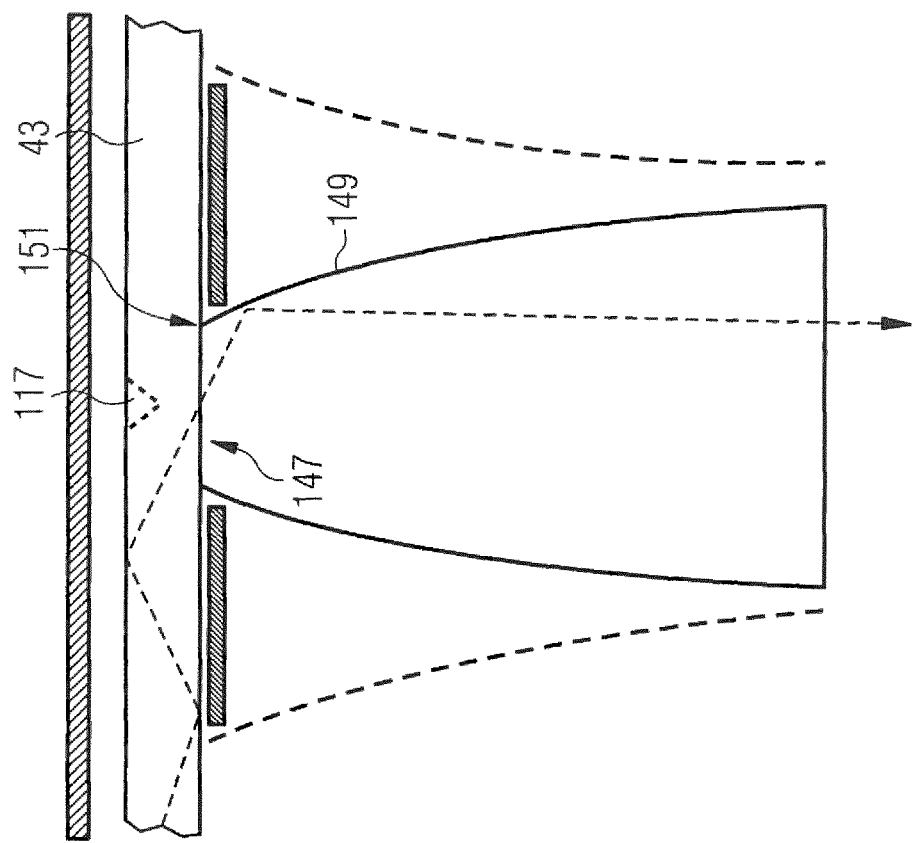
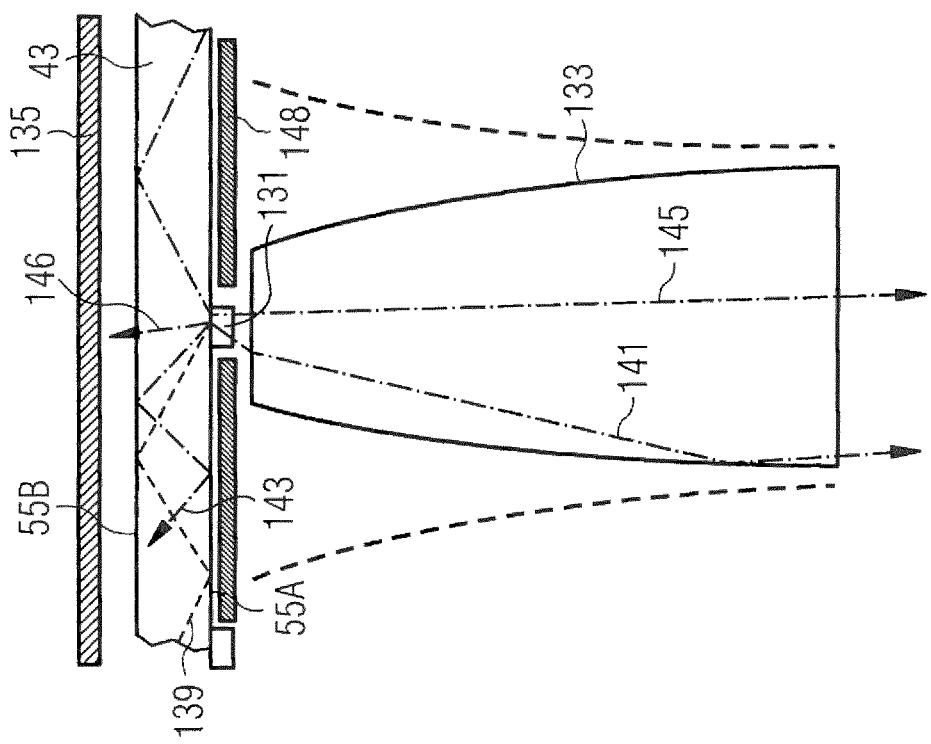

US 10,677,981 B2

LARGE AREA LIGHT SOURCE AND LARGE AREA LUMINAIRE

TECHNICAL FIELD

The present disclosure relates generally to luminaires, and in particular to a light source for luminaires intended, for example, for imitating natural sunlight illumination. Moreover, the present disclosure relates generally to generating a light beam from a large area with high brightness and homogeneity of the luminance across the area.

BACKGROUND

Artificial lighting systems for closed environments often aim at improving the visual comfort experienced by users. In particular, lighting systems are known which imitate natural lighting, specifically sunlight illumination, in particular using light with a high correlated color temperature (CCT), and a large color rendering index (CRI). The characteristics of such outdoor lighting to be imitated depend on the interaction between the sunlight and the earth atmosphere and create a specific shade characteristic.

EP 2 304 478 A1, EP 2 304 480 A1, WO 2014/076656 A1, WO 2014/075721 A1 as well as PCT/EP2014/000835 filed on 27 Mar. 2014, all filed by the same applicants, disclose lighting systems with a light source producing visible light in particular in form of a low-divergent light beam, and a panel containing nanoparticles. During operation of the lighting system, the panel receives the light from the light source and acts as a so-called Rayleigh diffuser, namely it diffuses light rays similarly to the earth atmosphere in clear-sky conditions. Specifically, the concept uses directed light, which corresponds to sunlight and generates shadows in presence of lit objects, and diffused light with a larger CCT, which corresponds to the light of the blue sky.

For providing cool white light as well as warm white light, LED based light sources may be used that are based on, for example, phosphor-converted white LEDs and/or a combination of various color LEDs. The optical properties of light emitted from LEDs require beam shaping optical configurations, usually collimating optics such as lens and/or mirror systems. An exemplary light source configured as a light beam projector is disclosed in PCT/EP2014/001293 filed on 13 May 2014 by the same applicant.

Furthermore, luminaires intended for providing a skylight appearance are disclosed in US 2014/0321113 A1.

The present disclosure is directed, at least in part, to improving or overcoming one or more aspects of prior systems. In particular, light sources and luminaires for replicating sunlight and skylight are of interest that have a form factor suitable for high volume and low cost manufacturing.

SUMMARY OF THE DISCLOSURE

In an aspect of the present disclosure, a light source for emitting collimated light is disclosed that, in particular, may be for a large area luminaire such as an edge-lit large area luminaire. The light source comprises a light guide unit comprising a plurality of light guide strips, wherein the light guide strips define together, for the light guide unit, a main front face, a main back face, and at least one coupling face. For example, a coupling face may connect the main front face and the main back face in a thickness direction. For the light source, each light guide strip of the plurality of light guide strips is configured for guiding light received at the at least one coupling face. The light may be guided, for example, by total internal reflection. Each light guide strip comprises a plurality of localized light source regions at the main front face for having light pass there through, wherein the light source regions are provided along the light guide strip within a non-source region. The light source comprises further a plurality of light emitting units for emitting light into the light guide strips through respective portions of the at least one coupling face, and a collimation unit extending along the main front face and comprising a plurality of collimating elements. Each collimating element comprises an input side and an output side, is optically associated to one of the plurality of light source regions, and is configured to receive light emerging from the associated light source region at its input side and to emit collimated light from a respective collimated light emitting region formed at its output side.

In another aspect, light source for emitting collimated light in particular for a, for example edge-lit, large area luminaire comprises a light guide unit having a main front face, a main back face, and at least one coupling face, which may be a lateral coupling face connecting the main front face and the main back face in a thickness direction. The light guide unit is configured for guiding light received at the at least one coupling face, for example by total internal reflection between the main front face and the main back face. Its main front face comprises a plurality of localized light source regions for having light pass there through, wherein the light source regions are provided substantially uniform within a non-source region. The light source further comprises a plurality of light emitting units for emitting light into the light guide unit through the at least one coupling face, and a collimation unit extending along the main front face and comprising a plurality of collimating elements, wherein each collimating element comprises an input side and an output side, is optically associated to one of the plurality of light source regions, is configured to receive light emerging from the associated light source region at its input side, and to emit collimated light from a respective collimated light emitting region formed at its output side.

In another aspect, a light source for emitting collimated light in particular for a (e.g. edge-lit) large area luminaire comprises a light guide unit comprising a plurality of light guide strips defining a main front face, a main back face, and at least one coupling face (e.g. configured as a lateral coupling face connecting the main front face and the main back face in a thickness direction. Each light guide strip of the plurality of light guide strips is configured for guiding light received at the at least one coupling face e.g. by total internal reflection. The light source comprises further a plurality of light emitting units for emitting light into the light guide strips through respective portions of the at least one coupling face, and a collimation unit extending along the main front face and comprising a plurality of collimating elements, wherein each collimating element comprises a compound parabolic concentrator or TIR lens having an input side optically coupled to one of the plurality of light guide strips such that a plurality of light source regions are formed along the respective light guide strips at which the compound parabolic concentrators or TIR lenses receive light from the light guide strips, and each collimating element is further configured to emit collimated light from a respective collimated light emitting region formed at its output side.

In another aspect, a light source for emitting collimated light in particular for a large area luminaire comprises a light guide unit comprising a plurality of light guide strips defining a main front face, a main back face, and at least one coupling face such as a lateral coupling face connecting the main front face and the main back face in a thickness direction. Each light guide strip of the plurality of light guide strips is configured for guiding light received at the at least one lateral coupling face e.g. by total internal reflection, and comprises a plurality of localized light source regions at the main front face for having light pass there through. The light source further comprising a plurality of light emitting units for emitting light into the light guide strips through respective portions of the at least one coupling face and the light emission extends in the thickness direction over an angular range of below 40° such as below 20°, e.g. about 10°, around an input light central direction. The light source further comprises a collimation unit extending along the main front face and comprising a plurality of collimating elements, wherein each collimating element comprises an input side and an output side, is optically associated to one of the plurality of light source regions, and is configured to receive light emerging from the associated light source region at its input side and to emit collimated light from a respective collimated light emitting region formed at its output side.

In some embodiments, the light emitting units may be configured to emit primary light with a spectral distribution that compensates for spectral losses accumulated by the primary light while propagating within the light guide unit, and/or the light emitting units may comprise subgroups for generating counter-propagating light within the light guide unit to compensate for losses accumulated by the primary light while propagating within the light guide unit and to provide for comparable light extraction at comparable light source regions such that the luminance per area section of the light emitting face is essentially homogeneous.

In another aspect, a large area luminaire, for example, an edge-lit large area luminaire comprises a light source as described above, and a chromatic diffusing layer comprising a plurality of nanoparticles embedded in a matrix and configured to provide for a direct transmission that is larger in the red than in the blue and for a diffuse transmission that is larger in the blue than in the red, wherein the chromatic diffusing layer is in particular positioned to by illuminated by the collimated light or is positioned downstream of the light source regions such as downstream of the input side and/or the output side of the collimation unit.

In some embodiments of the luminaire, the chromatic diffusing layer may be provided as a panel that has a back side provided at a light emitting face of the light source for being illuminated by incident light, and wherein in particular there may be an air gap between the collimating unit, and/or wherein the collimation unit may comprise a first collimating element layer and a second collimating element layer and the chromatic diffusing layer may be positioned between the first collimating element layer and the second collimating element layer, or wherein the collimation unit may comprise a first collimating element layer and a second collimating element layer that is located downstream of the first collimating element layer and comprises the matrix and the plurality of nanoparticles, or wherein the collimation unit may comprise a coating with the matrix and the plurality of nanoparticles applied to a light emitting face formed by surfaces associated with the collimated light emitting regions.

It is noted that the features recited for one or more independent claims as dependent claims will equally apply to other aspects as disclosed in the description or listed in the claims. Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 4A to FIG. 4M are schematic illustrations of exemplary coupling configurations of primary light sources and light guide units;

FIG. 5A to FIG. 5C are schematic illustrations of light extraction from the light guide unit in a reflective mode;

FIG. 6A to FIG. 6D are schematic illustrations of light extraction from the light guide unit in a transmission mode;

DETAILED DESCRIPTION

Figure 1:
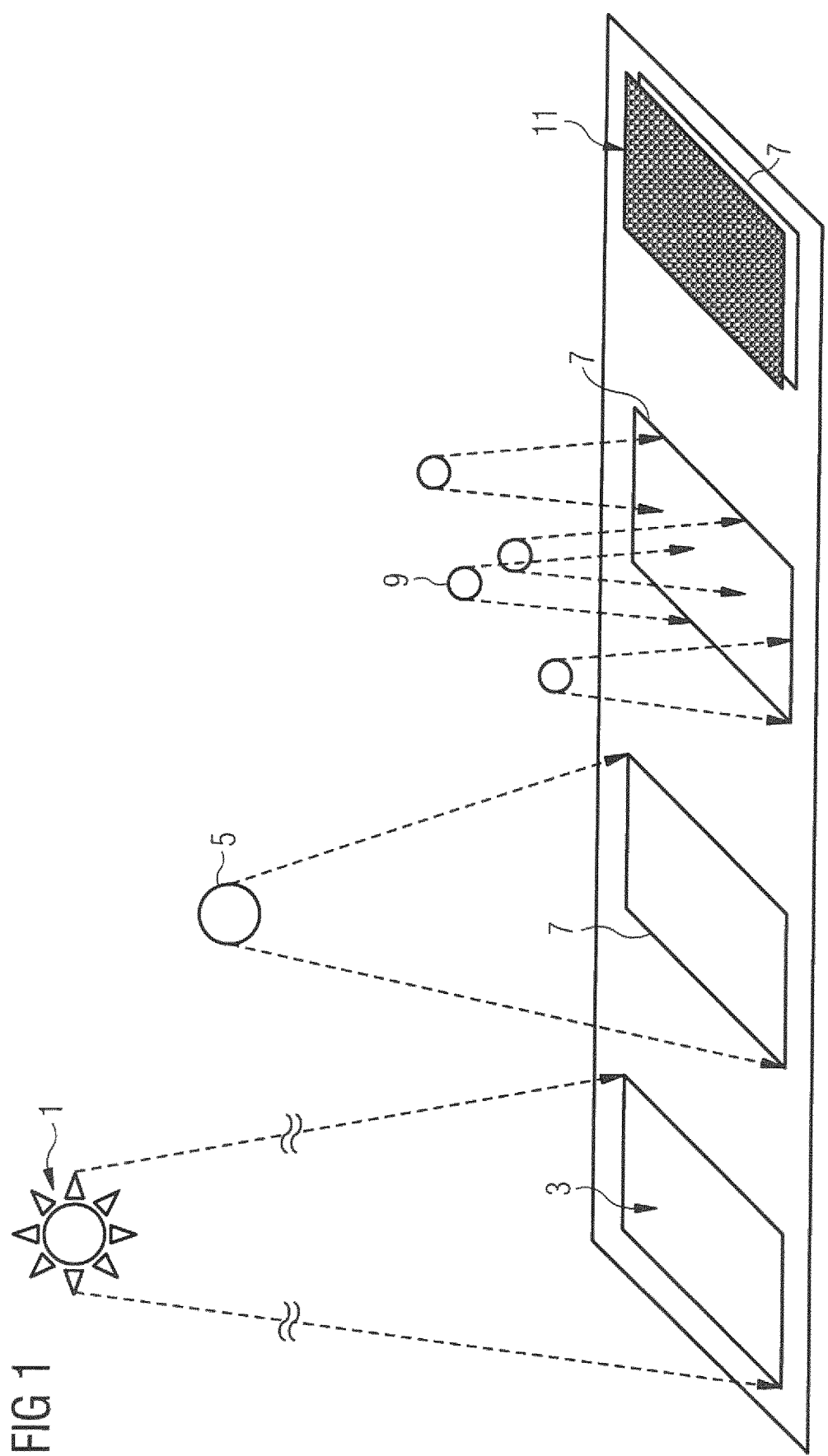
FIG. 1 is a schematic illustration of the concept of condensed sunlight imitating luminaires.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the aspects relating to configuration of a (thin) light guide (herein also referred to as waveguide approach) with output providing light beam emission with a very small beam divergence (such as below 4°), possibly with a circularly symmetric emission (such as light emission within a cone).

For example, the disclosure is based in part on the realization that a waveguide approach might address the following aspects: Efficiency, i.e., how can light be coupled into as well as guided as well as coupled out from the light guide unit efficiently because absorption (of the material, of reflective surfaces, etc.) and losses (scattering, imperfections of the surfaces, spurious reflections) may significantly reduce the light output. Collimation: i.e., how can light be extracted from the light guide unit while obtaining a very small beam divergence. It is noted that herein the term collimation or to collimate are understood as to refer to light that is of low divergence in correspondence to the specific embodiment and, for example, luminaire implementation. In some embodiments, a low divergent beam emitted from a light source may have a full-width beam angle in the range of (below) 5° such as 4° or below, e.g. 2°, while in some embodiments it may be in the range of (below) 10° such as 7° such as 4° or below, e.g. 2°.

Regarding, for example, the above aspects, the inventors realized inter alia that—instead of letting the beam propagate inside the light guide unit within the angular range with respect to the guide direction of ±θ, with θ being at the most the complementary angle of the TIR angle (the TIR angle in PMMA, considering n=1.4936, is roughly 42°)—light may be coupled into the light guide unit in form of a narrower angular fan. For example, inside the guide medium the angular fan may spread over ±15°, such as ±10°, or even ±5°, or even less. The angular fan may be centered at an angular direction such that the fan is close to the edge of the light guide acceptance range. The inventors realized that the probability of interaction of the light propagating inside the light guide unit with the surface on which the light extracting features are organized (e.g. in an array structure) is increased.

Moreover, the inventors realized that—instead of considering a full planar light guide unit, the light guide unit may comprise (be divided into) a series of parallel "strips". Each strip receives primary light from LED sources positioned at one or both ends at their extrema. The extracting features may be a single line array along the strip. Also the strip configuration increases the probability of interaction of the light propagating inside the light guide unit with the surface on which the light extracting features are positioned.

In general, the inventors realized solutions that enhances the probability of interaction with the extracting features of the light guide unit, thus reducing the path of the light rays inside the volume of the guide. This further reduces absorptions from the material and from the guide extrema (which are not 100% reflective).

Moreover, the inventors realized that chromatic shifts in the output spectrum due to absorptions can be compensated by properly tailoring the input spectrum of the light propagating within the guide.

In the following, background considerations of etendue conservation in the context of sun-sky-like illumination concepts are given that form a basis for the various aspects of light sources and luminaires disclosed herein.

Referring to FIG. 1, the sun 1 is 149 600 000 km from the earth and has a diameter of 1 391 684 km, which results in an approximate full-width beam angle of about 0.53° for direct solar radiation at the earth's surface (exemplary indicated by a window 3). As described in the above referenced patent disclosure of the applicant, light from the sun at the earth can be replicated by combining a high-intensity light source 5 with a properly designed Rayleigh-like acting diffuser 7. Assuming a light source with a standard 2' (0.61 m)×4' (1.22 m) aperture (area: 0.74 m$^2$), which is designed to approximate direct sunlight, the etendue of the light source is supposed to be ≤0.74 m$^2$ π sin(0.53/2)$^2$ sr~50 mm$^2$ sr. If the light source were single and based on a chip-on-board (COB) style light-emitting diode (LED), which provides a Lambertian circular emitter, the allowable light-emitting area would be 50 mm$^2$ sr/π sr32~16 mm$^2$, meaning the light emitting surface (LES) diameter of the LED would be 4.5 mm.

Standard light output from a 2'×4' aperture is usually at least 3000 lm (see DesignLights Consortium™ Product Qualification Criteria, Table 4: Primary Use Requirements). In order to provide a reasonable level of light output, and accounting for reasonable system optical losses, one may need to select a larger COB LED than 4.5 mm LES. For example, Nichia Corporation's NFDWJ130B may provide more than 6000 lm with an LES diameter of 14.6 mm, or etendue of 167 mm$^2$ π sr=526 mm$^2$ sr. Due to etendue constraints such a source could best achieve a beam half-angle divergence of 0.86° assuming the above aperture size, i.e. larger than that of direct solar radiation but still very narrow and potentially adequate for imitating sun illumination.

Collimating the Lambertian light output of the COB LED for use in a lighting system may be based on known collimating optical solutions such as lenses or compound parabolic concentrator (CPC) or total internal reflectoin (TIR) optics, herein also referred to as CPC lens and TIR lens, respectively. For a full CPC, the optical element dimensions are determined by the relation $L=\cot(\beta\_in/2)(a+b)/2$, where L is the optical element length, a and b are the diameters of the input and output surfaces, and $\beta\_in/2$ is the maximum allowed divergence half-angle inside the CPC. The maximum half-angle $\beta\_out/2$ exiting the CPC is then given by $n \sin(\beta\_in/2)=\sin(\beta\_out/2)$. From etendue conservation, an area of the CPC's output surface is about $1/\sin(0.86)^2=\sim 4400$ times the area of the input surface, or a diameter of about 1 m. Ignoring the fact that the optical element is a bit too large for the 2'×4' aperture, the length of the CPC lens would be more than practically feasible.

The inventors noticed that the total area from which light is emitted from the LED (only about 170 mm$^2$) is much smaller than that of the aperture (0.74 m$^2$). As shown in FIG. 1, an optical system may be formed comprising an array of multiple light emitting units 11 that together accomplish simulating the sun. As an intermediate step illustrating the condensation of the lay out, a configuration with a small number of sources (here four sources 9) is shown in FIG. 1. Similar concepts were disclosed in the above referenced WO 2014/075721 A1, which is incorporated herein by reference.

For the embodiment with a large number of light emitting units 11, because any one light emitting source is much smaller than the total area of the light emitting face of the optical system, the thickness will be reduced with respect to the case of a single CPC lens.

Following the etendue-based design considerations described above, FIG. 2A illustrates the dependence of the length of a CPC lens vs. the individual light source diameter. The dependence is exemplarily given for target beam divergences of 0.5°, 1°, 2°, and 4°. The dependency is considered in the designs of a direct sunlight luminaire disclosed herein. For example, FIG. 2A indicates that the diameter of 50 μm for light source regions may allow a 2° beam divergence with a CPC length of about 120 mm. Those dimensions indicate already the potential of a design of a flat luminaire system with an overall thickness less than six inches (152 mm), which is very attractive from a cost (bill-of-materials, BOM) and installation point of view.

Figure 2A:
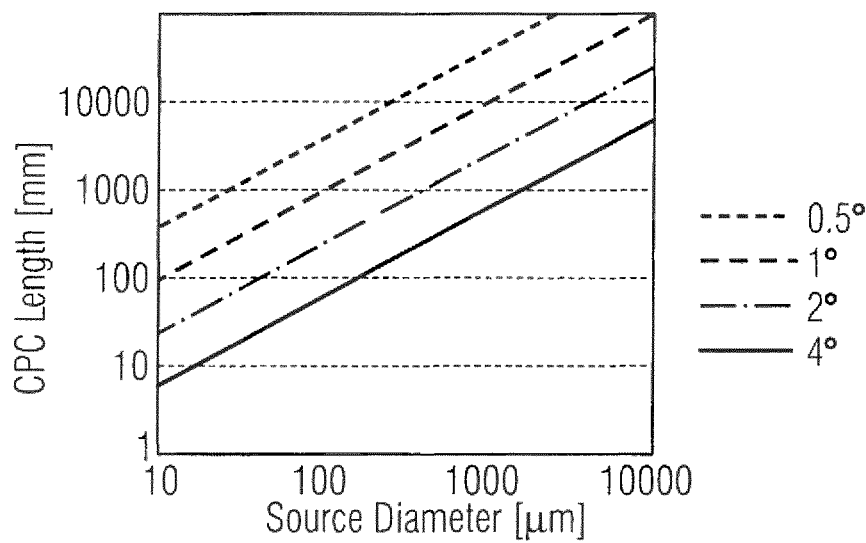
FIG. 2A to FIG. 2C are graphs illustrating design considerations for light sources of collimated light.
Figure 2B:
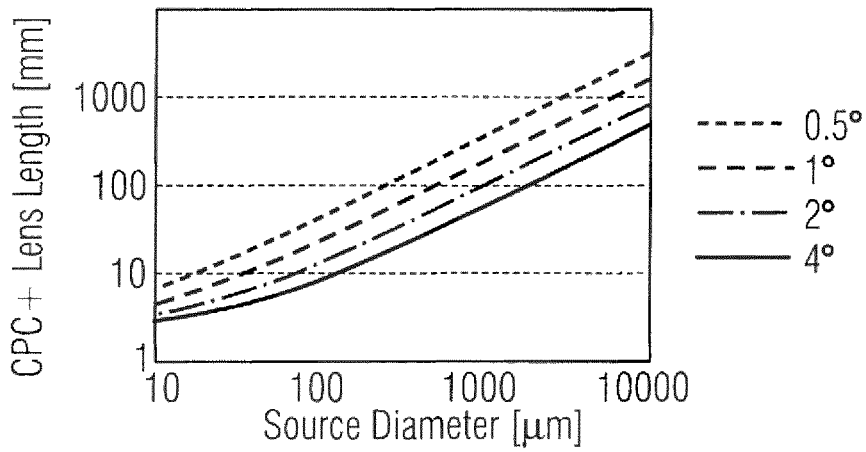

As shown in FIG. 2B, the total length of the collimation unit may be shortened significantly by replacing a full CPC (consisting only of a CPC that provides for the respective collimation) with a combination of collimating optical elements comprising a CPC with large divergence angle (such as 30° or even 45° or more) and a collimating lens such as a Fresnel lens (herein referred to as CPC-lens collimator). In this case, the limited concentration effect of the CPC is acceptable as part of the collimation is performed by the collimation lens For example, the required length for the collimating unit as discussed above in connection with FIG. 2A is reduced from 120 mm to about 8 mm, thereby enabling even lower-profile sun/sky luminaires that would be very attractive in the marketplace.

Figure 2C:
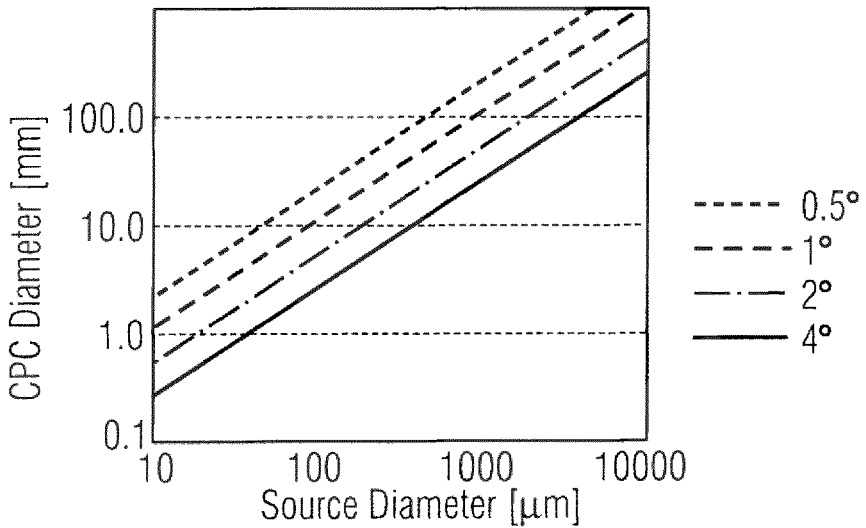

In FIG. 2C, the dependence of diameter of a full CPC lens vs. source size and beam divergences is illustrated. Similar dimensions will apply to a CPC-lens collimator discussed above in light of etendue conservation considerations. This information provides for the expected area of the collimated light emitting regions downstream of the collimation unit. The inventors realized that the use of this information is important because stray light or no light from regions outside the main narrow beams (i.e. non-collimated light or dark areas around the collimated light emitting regions) may adversely affect the impression of depth and the simulation of sunlight. Such stray light may occur at the edges of optical elements. Thus, the inventors realized that the pitch or scale of stray light is tied to the collimating optical element lens diameter. Specifically, stray light could be perceivable with luminance periodicities linked to the pitch of collimation optics (but not limited to this).

Thus, in addition to the aspects of FIGS. 2A and 2B, the teaching of FIG. 2C may be used to design a sunlight luminaire according to the herein disclosed principles. In particular, one may design a system in which stray light occurs over a sufficiently small pitch. For example, for typical viewing distances such as 1 m to 5 m, the inventors have noticed that stray light at pitches of a few millimeters or less does not appreciably detract from the eyes' view of the image of the "sun" as occurring at an infinite distance, which is an important feature when simulating the sun. FIG. 2C shows that for a 2° beam divergence, a CPC exit diameter of 2.9 mm can be achieved with an optical source size of about 50 μm diameter. Similarly, a CPC exit diameter of 5.8 mm may be achieved for an optical source size of about 100 μm diameter. It is noted that in some surroundings smaller (elevator: several ten centimeter to about a meter) or larger (large halls: up to 10 m and more) viewing distances may occur, where small viewing distances are more challenging from the optical design perspective.

From the above optical source sizes on the order of, for example, 50 μm to 100 μm in lateral extension may form a basis to provide a luminaire that simulates direct sunlight and that is suitably thin and can be produced by potentially low cost. However, LEDs commonly have LES dimensions larger than 200 μm. Even a 200×200 μm² LED chip solution, targeting a beam divergence of 2°, may result in a luminaire thickness larger than 0.5 m for a full CPC collimation unit and would have stray light spatial variation over distances of about 1 cm (corresponding to the size of the CPC exit diameter and, thus, essentially setting the pitch between optical sources), which might reduce the sun simulation effect. Thus, smaller light sources or smaller light source regions are desirable.

The inventors have realized that it is possible to transform optical sources such as LEDs from one form factor into another by utilizing down-conversion and/or scattering features and/or reflecting features, herein also referred to as extractors. Exemplary extractors are disks of luminescent down-converting phosphor compounds. For example, grains of luminescent down-converting phosphor compounds may be mixed into a suitable binder (e.g., silicone) and dispensed (e.g., by a dispenser machine) onto a surface in the form of a disk. Light from a primary light emitting unit (e.g. an LED or laser diode, LD) can be directed/fall onto the disk. The disk of down-converting phosphor compounds itself may then become a new optical source. In general such a new optical source is referred to herein as a localized light source region that is energized by the light of the primary source (herein also referred to as light emitting unit). That localized light source region may have the desired size for collimation in a thin optical structure as discussed above.

Suitable down-converting materials include phosphors, phosphor compounds, organic light emitting materials, semiconductor materials, and semiconductor nanoparticles (such as "quantum dots"). A list of common down-conversion materials is disclosed in US 20150049460 A, some are exemplarily listed in Table I below.

In an exemplary embodiment, the disk of down-converting phosphor compounds may be deposited on either side of a light guide plate (LGP). LGPs are commonly used in the flat panel display industry, where they may include primary light sources properly coupled to its edge(s). However, those flat panel displays may include a high density of built-in light-extraction or light-scattering features for light emission (for example, the size of those features is comparable (and not much smaller as in the present disclosure) to the distance between nearest neighbors). In contrast, LGPs for the herein disclosed concepts are configured to guide light from primary light sources to specific extraction positions of the localized light source region (e.g. disks).

In the above exemplary embodiment and provided that the edges of the LGP are made reflective (e.g. using a reflective film), light in the LGP may remain substantially trapped until it encounters a disk. Then, secondary (down-converted) light (if any) and scattered primary light from the disk are emitted in a more or less Lambertian radiation pattern, meaning that a significant fraction of that light will escape the LGP either directly at the disk or on the opposite side. That light would be associated with a source size determined by the size of the disk. Assuming that many such disks may be provided, light from the primary light sources coupled into the LGP at the edge(s) may be transformed into light originating from an array of very small disks.

Extending the above exemplary embodiment, the small disks may be coupled to an array of collimating elements, e.g. a CPC or a CPC-lens collimator as described above or a TIR lens or TIR lens-lens collimator, thereby forming a compact luminaire that simulates sunlight. In particular, the output area (diameter for a circular shape) of the collimating element sets the pitch of the extractor features/disks applied to the LGP to ensure a uniform and homogenous emission of light over the light emitting face of the light source. The input area of a collimating element is configured to receive a substantial amount of light from the respective light source region (for example more than 50%, such as more than 80%, or even more than 90%).

In the above exemplary embodiment, the down-converting phosphor compounds may be selected and adjusted to provide for a sun-like light spectrum. However, the inventors realized further that down-conversion materials may be omitted if the respective sun-like spectrum can be generated by combining multiple light sources of varying colors. For example, the primary light sources might comprise blue-, green-, red-, or even white-emitting LEDs. In this case, the light extractors may be scattering features such as rough surface regions or regions of changes in refractive index that spoil the transmission of the LGP in a defined and localized manner. The inventors have realized that this may provide means for uniform light mixing of light sources of different colors, and in extremely small form factors, and, combined with the teaching above, may lead to the realization of very narrow-divergence light beams with color tuning options. For example, the relative light outputs of the primary light sources may be varied either by amplitude or pulse-width modulation in color and/or intensity. In some embodiments, the effect of scattering centers and the effect of down-converting materials may even be combined. The latter might be useful in cases in which the down conversion materials are not inherently scattering, such as in the case of semiconductor nanoparticles often called "quantum dots".

By assuming etendue conservation, the ratio between the area of input face and the output face, e.g. as described below the ratio between the (combined) areas of the light source regions and the respective area covered by the light guide (e.g. the area of the main front face of a light guide panel or the aperture size for a light guide strip configuration) are the (inverse of the) ratio between the solid angles of the light in correspondence of the input and output faces $(r=(0.5*\sin \alpha\_out)^2/n^2(0.5*\sin \alpha\_in)^2$.

In the following, the ratio is indicated for the input divergence of the primary light source (outside the light guide), the respective input divergence within the light guide, and the target output divergence of 2° and 4°, respectively. A refractive index of 1.493 for the light guide and full angular divergences were considered. As will be understood by the skilled person, the angular divergence within the light guide unit needs to be applied for the etendue conservation considerations. Moreover, it is assumed that the angular content is uniformly distributed at the input face; because the light source regions are at the front surface of the light guide. It is noted that in some embodiments, the light source regions may not necessarily correspond to the region of extractive interaction (see reflective structure 117 of e.g. FIG. 5B and description of respective embodiments) such that the angular content may have developed to no longer be evenly distributed. The latter is one example why, even if etendue is conserved, the area of the respective source regions is larger than required by etendue conservation considerations. The ratio given in the overview below refer to that small area instead of the potentially larger area of extractive interaction.

| Input divergence (outside medium) | Input divergence (inside medium) $\alpha\_in$ | Output divergence (outside medium) $\alpha\_out$ | Ratio r |
|---|---|---|---|
| Lambertian | ~84° | 2° | 0.03% |
| Lambertian | ~84° | 4° | 0.12% |
| 60° | 39° | 2° | 0.11% |
| 60° | 39° | 4° | 0.45% |
| 40° | 26.5° | 2° | 0.25% |
| 40° | 26.5° | 4° | 1.01% |
| 20° | 13.4° | 2° | 1% |
| 20° | 13.4° | 4° | 4% |
| 15° | 10° | 2° | 1.78% |
| 15° | 10° | 4° | 7.12% |
| 10° | 6.7° | 2° | 4% |
| 10° | 6.7° | 4° | 16% |
| 7° | 4.7° | 2° | 8.2% |
| 5° | 3.35° | 2° | 16% |

As can be seen, the ratio can be increased by using less divergent light being coupled into the light guide. The ratio, thus, depends on the input divergence and the targeted output divergence and lies in the range of below 0.1% up to 10% or even up to 16% for the indicated parameters. It is noted that below-Lambertian input divergences apply in particular for white light emitting primary light sources using CPC coupling such as for down-converted LEDs, while the combination of laser diodes with down-conversion materials at the entrance side of the collimating element will essentially correspond to Lambertian emitters. For LED based embodiments, for example, a ratio of up to 10% may allow configurations providing the desired low-divergent light beam.

It is noted that in embodiments that allow providing some kind of pre-collimated light at the light source regions, the etendue considerations summarized above may include that reduced etendue as a starting point. Accordingly, the skilled person will acknowledge that configurations with a smaller pitch may be possible that still provide for an acceptable beam half-angle divergence. This may apply, for example, to the embodiments using a reduced fan LED (resulting in low angular ranges in the light guide), laser diodes, and/or focusing extractors.

In the following, at first an overview of a general configuration of a luminaire based on the herein disclosed concepts is described. Then various embodiments of portions such as the light source, the underlying light coupling into and extraction from the light guide unit are illustrated.

Figure 3A:
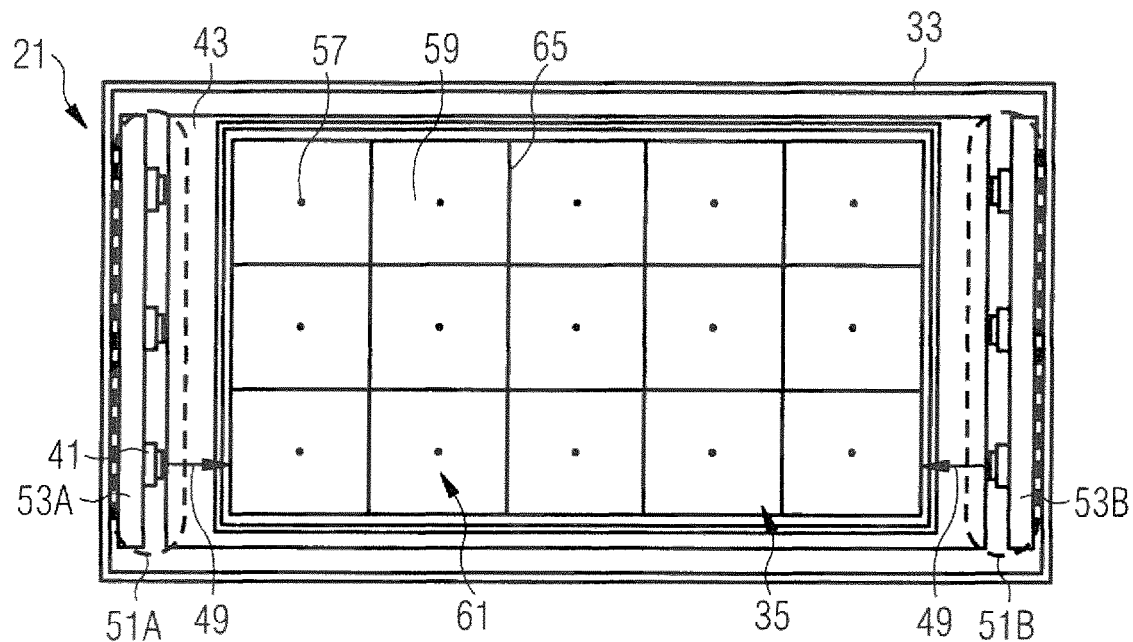
FIG. 3A and FIG. 3B are schematic front and cut views of a condensed sunlight imitating luminaire.
Figure 3B:
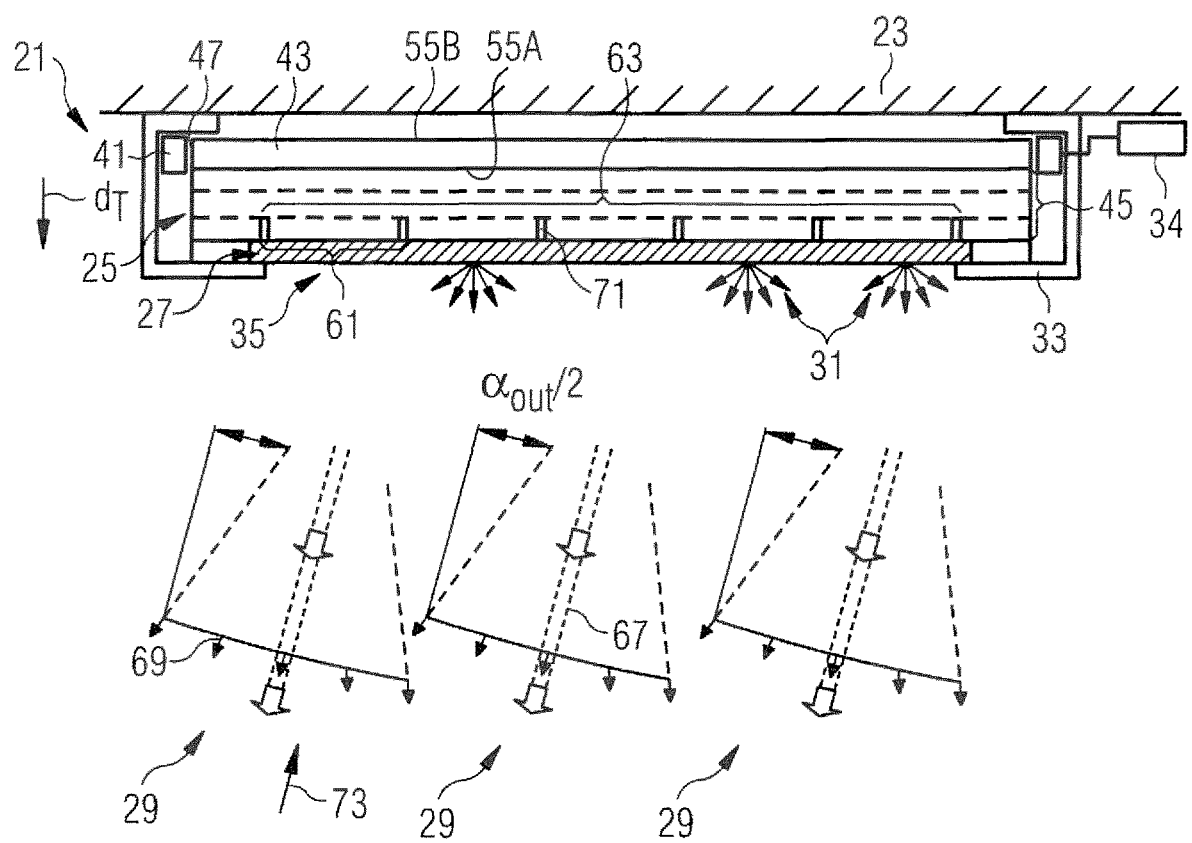

FIGS. 3A and 3B illustrate a luminaire 21 as it may be mounted at, for example, a wall 23 (ceiling or side wall) of a room in a building. Luminaire 21 comprises a light source 25 and a chromatic diffusing layer 27 that together provide for a sun-like illumination. Specifically, light source 25 provides for an array of direct light beams 29, a part of which is transformed into a blue sky-like diffuse light 31 by chromatic diffusing layer 27, the remaining part passes through the chromatic diffusing layer 27 being perceived as a sun ray falling through a window in wall 23.

In general, luminaire 21 may comprise a housing 33 covering and holding together the various components as an exemplary mount. As shown in FIG. 3B, in some embodiments, housing 33 may delimit an aperture 35 of the luminaire 21 through which the array of direct light beams 29 and blue sky-like diffused light 31 can be enter the room. In some embodiments, the luminaire 21 may be mounted within wall 23 and/or may have the housing covering only the lateral sides and the back side.

A power supply and/or a control unit 34 may be provided within the housing or—as shown in FIG. 3B—may be positioned externally to housing 33.

In FIGS. 3A and 3B, components of an exemplary inner structure of light source 25 comprise a plurality of light emitting units 41, a light guide unit 43, and a collimation unit 45.

Specifically, light emitting units 41 act as primary light sources and are configured for emitting light into light guide unit 43 through at least one lateral coupling face 47 of light guide unit 43 in a light emitting direction 49. Light emitting direction 49 is understood herein as the direction from a respective one of the plurality of light emitting units 41 to light guide unit 43 as exemplarily indicated for two light emitting units in FIG. 3A.

In FIG. 3A, light emitting units 41 are grouped in two subgroups 51A and 51B. For each subgroup 51A and 51B, the respective light emitting units 41 are distributed along a respective lateral side of light guide unit 43 and emit light along the direction in which the longitudinal sides of light guide unit 43 extend. Subgroups 51A and 51B may be mounted to respective boards 53A, 53B that are connected to power supply and/or control unit 34 and may comprise electronic devices configured to control the output parameters of light emitting units 41 such as intensity and color spectrum, depending on the type of light emitting units 41.

In general, light guide unit 43 has a main front face 55A, a main back face 55B that are connected by lateral coupling faces 47 in general in a thickness direction $d_T$. Light guide unit 43 is configured for guiding light received at the at least one lateral coupling face by total internal reflection (TIR) between main front face 55A and main back face 55B. Light guide unit 43 may be, for example, a high index waveguide.

As will be understood, within light guide unit 43, light propagates from opposing lateral sides towards the respective other lateral side at which some of the light may be reflected back. In general, the light distribution within light guide unit 43 depends on the positions of light emitting units 41, the type of coupling into light guide unit 43, and the light propagation conditions within light guide unit 43 such as total internal reflection, absorption effects and reflectivity of the lateral sides, as well as the light extraction provided to extract light from light guide unit 43.

In the embodiment of FIG. 3A, a panel-like shape of light guide unit 43 is indicated but also other shapes such as triangular or strip-configurations may be possible as will be described below. In general, a thickness of light guide unit 43 may be in the range from 1 mm to 5 mm or even less in particular in strip-configurations.

In FIG. 3A, a grid of 5 times 3 localized light source regions 57 is indicated exemplarily. However, in general large numbers of up to several 10 thousand light source regions 57 may be present (e.g. an "emitter grid" of 88 000 of 100 µm extracting features on a 2'×4' panel for 4° final divergence and about 22 000 extracting features for a 2° final divergence). At localized light source regions 57, light is extracted from light guide unit 43 to enter light collimation unit 45. Light source regions 57 are evenly distributed over light guide unit 43 at least within aperture 35. For example, light source regions 57 are distributed over a non-source region 59 at equal distances in light emitting direction 49. In light source 25, non-source region 59 is an area of the main front face 55A of light guide unit 43 that does not essentially contribute light for illumination. For example, the light guide unit 43 is configured such that essentially no light leaks out at that non-source region 59. If any light does leave light guide unit 43 from the non-source region 59 e.g. by leakage caused by some scattering etc. that light is either so low in intensity or distributed over a large angular range that it is not contributing to the perception or that it may be blocked by baffle structures as disclosed herein. For example, the total flux (power) from the non-source region 59 may be about or less than 10%, about or less than 5%, or even about or less than 2% of the flux originating from all light source regions, as defined below. Moreover, the local flux density (in average) of the non-source region 59 may about or less than 3% such as about or less than 1% or even several magnitudes less than the flux density (in average) emitted from the light source regions. The distance between neighboring light source regions may, for example, be in the range from 0.5 mm to 15 mm such as about 3 mm or about 6 mm (herein also referred to as the pitch distance usually present in a light propagation direction, wherein the light propagation direction coincides in particular with the direction of a central axis of the light guide unit, and in particular the length dimension of a light guide strip). In light of the small size of each light source region, the ratio of the area of the plurality of light source regions 57 with respect to the area of the main front face 55A (or: the area of the non-source region 59) may be less or equal to, for example, 0.2%. It is noted that, with respect to the strip configurations disclosed herein, the non-source region may comprise section associated with the light guide strip as well as areas between light guide strips.

Some type of change in light propagation conditions will result in having light pass through main front face 55A at light source regions 57. The passing light may be a portion of the primary light, i.e. the light of light emitting units 41, or the light may be down-converted light e.g. generated by interaction of the primary light with a phosphor compound or a quantum-wall structure. Exemplary embodiments will be described below. In other words, light source regions 57 may be considered to be defined by the light passing through a region—either due to the fact that light is incident on a wall/interface forming the light guide unit with non-TIR-conditions due to scattering, reflection, down-conversion etc., or by changing/removing TIR-conditions at a localized area of the wall/interface forming the light guide unit.

As indicated above, the ratio of the area of the plurality of light source regions 57 with respect to the area of main front face 55A (or similarly the area of non-source region 59) depends on the angular distribution of the light being provided to a collimating element (e.g. as emitted from the light source region) and the intended collimation angle. The ratio may differ thus significantly for fixed collimation angles of e.g. 2° or 4° and primary light conditions such as the angular content (fan) of the light guided within the light guide unit. For Lambertian input light to the collimating elements, the ratio of the area of the plurality of light source regions 57 with respect to the area of main front face 55A may be, for example, 0.5% or 0.2% or less. However, for cases in which the light source regions emit narrow-solid angle light, the area of the of the area of the plurality of light source regions 57 and, thus the ratio, can increase substantially, for example, up to 10% or even up to 15% or 16% for large scale embodiments. Exemplary light source region may have diameters of about 3 mm arranged at a pitch of 10 mm (corresponding e.g. to the diameter of the collimating element at the exit side). In general, the smaller the ratio between the angles of the angular distribution being provided to the collimating element and the intended collimation angle, the smaller is the ratio between the areas of the light source regions and the main front face. Those considerations assume that the etendue is conserved in the optical designs.

Typical values for the above ratio may be below 0.5% such as the mentioned 0.2%, or even below 0.1%. As a further example, for a 100 µm light source region and a 2.9 mm collimator (pitch), the ratio is the same as for a single collimating element: 7850 µm$^2$/8.41 mm$^2$ (i.e. about 0.1%), assuming that the complete light source that does not have any "lost" areas between collimating elements (such as areas 199 in FIG. 8B).

In general, the size of a light source region 57 may have a lateral extension in the range from 10 µm to 500 µm such as 100 µm. Moreover, a light source region 57 may have a circular, elliptic, rectangular, or square shape or in principle any shape; however, the shape may influence the appearance of the light source in the far field. On contrast thereto, the thickness extension of light guide unit 43 may be is in the range from 1 mm to 5 mm, in some cases less than 1 mm. Light source regions 57 may be provided with the same size or essentially similar in size. Providing such light source regions 57 for the plurality of collimating elements may ensure similar input conditions for the received light at the input sides of the collimating elements.

In general, emission through the non-source region of the light guide unit is avoided or at least reduced to not spoil the perception of the sky-sun-imitation.

Accordingly, collimation unit 45 is configured to receive the light from light source regions 57 and, in general, to provide collimated light, e.g. having a divergence of few degrees to imitate sunlight.

Collimation unit 45 extends along main front face 55A and has a shape adapted to the shape of light guide unit 43 and in particular to the distribution of light source regions 57 and the shape of aperture 35.

Collimation unit 45 comprises a plurality of collimating elements corresponding to the grid of light source regions 57. The thickness of collimation unit 45 and thus collimating elements may be in the range from 1 mm to 0.3 m such as 2 mm to 15 cm.

Each collimating element is optically coupled to one of the plurality of light source regions 57. Thus, each collimating element is configured to receive (essentially only) light emerging from a respective light source region 57 and to emit collimated light from a respective collimated light emitting region 61. Collimated light emitting regions 61 may have a lateral extension similar to the pitch distance of the light source regions 57, e.g. in the range from 0.5 mm to 50 mm, and for well collimated primary light such as light from diode lasers even below such as 0.2 mm. Collimated light emitting regions 61 form a light emitting face 63 of light source 25. Face 63 may be a continuous surface, for example, in embodiments in which collimating units are formed of a lens array structure or a refractive CPC array structure. In embodiments in which collimating units are formed of, for example, a reflective CPC array structure, face 63 may not be surface as although light collimating regions 61 are not associated with a surface structure but instead may be associated with the respective output sides of the CPC array structure.

To perform the collimation, the collimating elements may comprise one or more optical elements such as a lens and/or a CPC lens. The collimating elements may form together, for example, a lens layer/CPC structure of transparent materials such as PMMA (which could also be used for the light guide unit and/or the matrix of the chromatic diffusing layer).

Light emitting face 63 may comprise a respectively small portion of non-emitting regions 65, e.g. at the boundaries between light emitting regions 61 indicated as (in FIG. 3A indicated as grid lines separating light emitting regions 61 such as transition or junction between lenses or refractive CPCs or the walls of reflective CPCs.

The emission of each light emitting region 61 is directed light having a broad spectrum (e.g. white light) and a defined small divergence around a main light beam propagation axis 67 as schematically indicated in FIG. 3B for that part of the directed light having passed through chromatic diffusing layer 27. Specifically, the emitted light distributes over an emission solid angle, thereby forming a light beam propagating along the direction of main light beam propagation axis 67. FIG. 3B illustrates exemplarily divergent (slowly diverging) direct light beams 29 in the far field. The far field depends on the near field as generated by the respective collimating element and the light being processed by the collimating element.

Figure 3C:
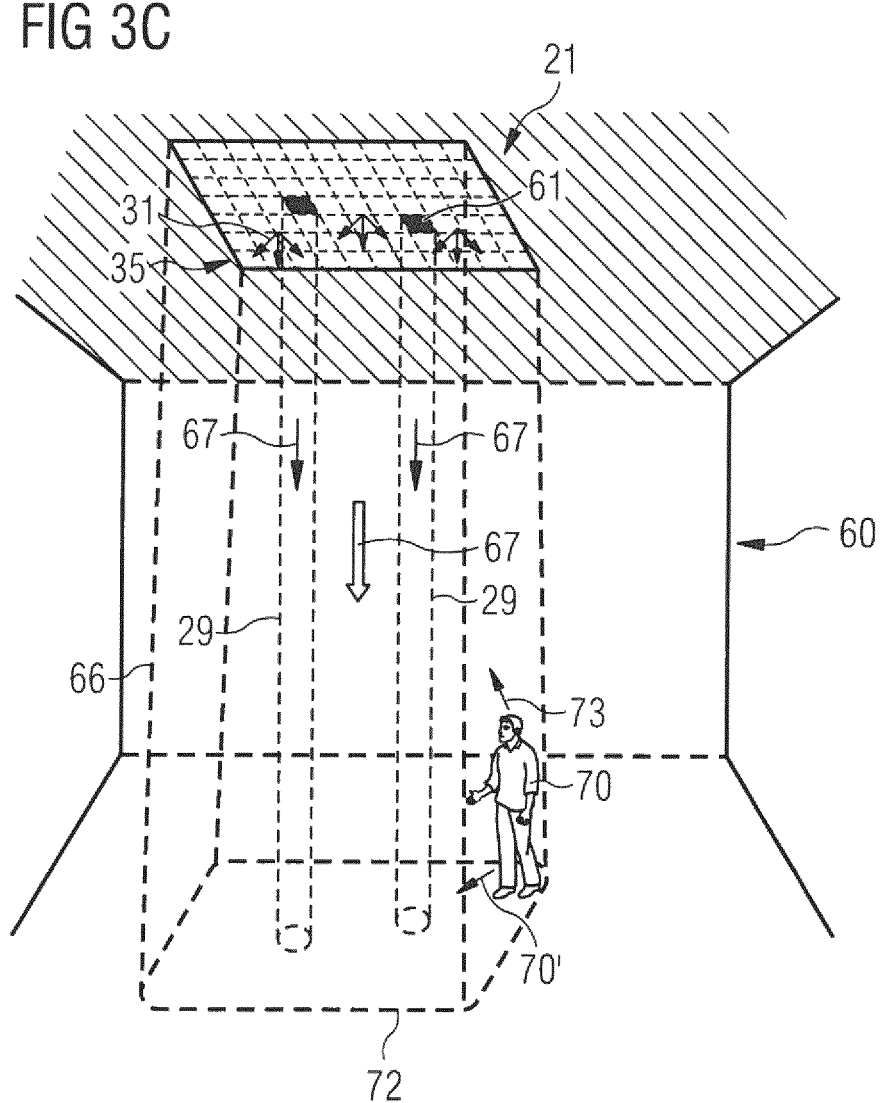
FIG. 3C is a schematic 3D-view of a room being illuminated with a luminaire such as the one of FIGS. 3A and 3B.

In the far field, the local propagation direction across divergent light beams 29, i.e. a propagation direction of the directed non-diffused light, varies in dependence of the position within the cross-section of direct light beam 29 with respect to propagation axis 67. Specifically, a localized propagation direction 69 is increasingly inclined with respect to main light beam propagation axis 67 with increasing distance from the inner area. Exemplarily, a maximum angle $\alpha\_out/2$ is indicated in FIG. 3B for localized propagation direction being the furthest out, which corresponds to a beam divergence (herein also referred to as beam full-angle divergence or total angular spread in the far field) of for example, 2° or 4° of direct light beam 29. For a light beam 29 of a single light source region (e.g. switching on just one light source region) the far field may already be essentially formed at a distance equal to the distance ceiling-floor (which may be an indoor luminaire-target) or even at smaller distances for more localized illumination. This is shown in FIG. 3C by indicating light beam 29 as essentially circular. With respect to the main light beam of an entire luminaire (being composed of many light source regions and thus extending over a much larger area), the far field may be considered to have formed at a much larger distance, e.g. of many tens of meters. In the far field, the essentially rectangular spot indicated by line 72 in FIG. 3C becomes circular as it loses the memory of the shape of the aperture. It is noted that the distance to form the far field of the main light beam depends on light angular divergence and luminaire size.

For a homogeneous emission, the area ratio between non-emitting region 65 and collimated light emitting regions 61 is essentially constant over light emitting face 63 of light source 25. Such a constant ratio may contribute to a homogenous light emission from light emitting face 63. Moreover, the emission from one collimated light emitting region 61 may be configured to be perceived as completely contained laterally (fully flashed) inside the collimated light emitting region 61. Assuming a symmetric beam divergence of direct light beams 29, the juxtaposition of collimated light emitting regions 61 is then perceived by an observer, looking at them from within the light beam, as a bright circular disk image, the diameter of which is related to the total angular spread in the far field, divided into a set of "pixels" corresponding to the collimated light emitting regions 61. The dimension of the single collimated light emitting regions 61 should be such that possible light modulation within the region are unlikely to be perceived by an observer looking at them from a typical viewing distance.

As further schematically indicated in FIG. 3B, collimation unit 45 may comprise some type of baffle structure 71 to decrease or even to avoid the interaction of light between, in particular neighboring, collimating elements downstream collimated light emitting regions 61 (herein also referred to as cross-talk between individual light beam generating optical sequences—including the light source region, and collimating element). In some embodiments, baffle structure 71 may be, for example, a structural element (e.g. a shielding plate or surface of an optical element) that is coated with a light absorbing and/or dark layer/material or that has a dark finish.

With respect to the chromatic diffusing layer of the reflective structural unit, the present disclosure relates to an optical diffuser as disclosed in WO 2009/156348 A1, filed by the same applicants.

It may comprise an essentially transparent solid matrix in which a plurality of solid transparent nanoparticles are dispersed, e.g. in a thin film, coating, or bulk material such as sandwich embodiments. In the present description the terms "diffusing layer", "nanodiffuser", and "chromatic diffusing layer" designate in general an optical element, which comprises a matrix embedding those (essentially transparent) nanoparticles.

The chromatic diffusing layer is in principle capable of (chromatically) separating different chromatic components of incident light having a broad spectral bandwidth (such as in general white light) according to the same mechanism that gives rise to chromatic separation in nature. Rayleigh scattering is creating, for example, the spectral distribution characteristic of skylight and sunlight. More particularly, the chromatic diffusing layer is capable of reproducing—when subject to visible white light—the simultaneous presence of two different chromatic components: a diffused sky-like light, in which blue—in other words the blue or "cold" spectral portion—is dominant, and a transmitted light, with a reduced blue component—in other words the yellow or "warm" spectral portion.

Referring to the transmission properties of a chromatic diffusing layer of luminaire 21, its structure is such that it achieves—based on the nanoparticles—such a specific optical property that comprises a transmission that is larger in the red than in the blue, and a diffuse scattering that is larger in the blue than in the red. The optical property may be present over essentially the complete range of aperture 35.

Herein, as defined in the Standard Terminology of Appearance, ASTM international, E 284-09a, the transmittance is in general the ratio of the transmitted flux to the incident flux in the given conditions. For example, the diffuse transmittance is a property of the respective specimen that is given by the ratio of the transmitted flux to the incident flux, where the transmission is at all angles within the hemisphere bounded by the plane of measurement except in the direction of the regular transmission angle. Similarly, the regular transmittance is the transmittance under the undiffused angle, i.e. the angle of incidence. In the context of the present disclosure, for a given wavelength and a given position on the chromatic diffusing layer, the diffuse transmittance and the regular transmittance are intended for non-polarized incident light with an incident angle corresponding to the main light beam propagation axis 67. For measurements, the angular size of the detector for the measurement of transmission and the angular aperture of the incident beam is selectable in a range as it will be apparent to the skilled person. In particular when considering (white light) low angle diffusers, for example, the angular size of the detector for the measurement of the regular transmittance and the angular aperture of the incident beam should be configured so that the sensor accepts rays with a transmission within a cone around the incident angle. In some embodiments, an angular aperture of 2 times 0.9° may be used.

Moreover, the transmitted flux is averaged over all possible incidence azimuthal angles. In case the measurement of the diffuse transmittance and/or the regular transmittance is hindered by geometrical or other physical constraints related to the configuration of the luminaire, the skilled person may have access to the above mentioned quantities by forming at least one separate chromatic diffusing layer and measuring the transmittance directly for that section. For details of microscopic structural properties, it is referred to, for example, the above mentioned publication WO 2009/156348 A1. However different values of microscopic parameters may be applicable. For example, one may apply parameters that lead to a larger amount of scattered light with respect to non-scattered light. Similarly, in the aim of minimizing or at least reducing the visibility of a possible stray light, one may prefer increasing the contribution to the luminance of the chromatic diffusing layer due to diffused light in spite of the fact that the resulting perceived color may depart from the color of a perfect clear sky. The latter may be caused by reducing the level of color saturation as a consequence of the multiple scattering arising therein and may be even caused at concentrations below the concentration giving rise to multiple scattering.

In the following, some microscopic features are summarized exemplarily.

The chromatic effect is based on nanoparticles having a size in the range from, for example, 10 nm to 240 nm. For example, an average size may be in that range.

It is well known from fundamentals of light-scattering that a transparent optical element comprising transparent matrix and transparent nanoparticles having different refraction index with respect to the matrix, and having sizes (significantly) smaller than visible wavelength, will preferentially scatter the blue part (the blue) of the spectrum, and transmit the red part (the red). While the wavelength-dependence of the scattering efficiency per single particle approaches the $\lambda^{-4}$ Rayleigh-limit law for particle sizes smaller or about equal to 1/10 of the wavelength $\lambda$, a respective acceptable optical effect may be reached already in the above range for the size of the nanoparticles. In general, resonances and diffraction effects may start to occur at sizes larger, for example, half the wavelength.

On the other side, the scattering efficiency per single particle decreases with decreasing particle size d, proportional to $d^{-6}$, making the usage of too small particles inconvenient and requiring a high number of particles in the propagation direction, which in turn may be limited by the allowed filling-fraction. For example, for thick scattering layers, the size of the nanoparticles embedded in the matrix (and in particular their average size) may be in the range from 10 nm to 240 nm, such as 20 nm to 180 nm.

In some embodiments, larger particles may be provided within the matrix with dimensions outside that range but those particles may not affect the Rayleigh-like feature and, for example, only contribute to forming a low-angle scattering cone around the main light beam direction. For example, a low-angle diffuser layer comprising particles with dimensions larger than the one of the nanoparticles and selected in size and density to contribute to forming a low-angle scattering cone around the main light beam direction may be provided as a separate layer or may be integrated within the chromatic diffusing layer.

The chromatic effect is further based on nanoparticles having a refractive index that is different than the refractive index of the embedding matrix. To scatter, the nanoparticles have a real refractive index $n_p$ sufficiently different from that of the matrix $n_h$, (also referred to as host material) in order to allow light scattering to take place. For example, the ratio m between the particle and host medium refractive indexes $$\left(\text{with } m \equiv \frac{n_p}{n_h}\right)$$

may be in the range $0.5 \le m \le 2.5$ such as in the range $0.7 \le m \le 2.1$ or $0.7 \le m \le 1.9$.

The chromatic effect is further based on the number of nanoparticles per unit area seen by the impinging light propagating in the given direction as well as the volume-filling-fraction f. The volume filling fraction f is given by $$f = \frac{4}{3}\pi\left(\frac{d}{2}\right)^3 \rho$$

with $\rho$ [meter$^{-3}$] being the number of particles per unit volume. By increasing f, the distribution of nanoparticles in the diffusing layer may lose its randomness, and the particle positions may become correlated. As a consequence, the light scattered by the particle distribution experiences a modulation which depends not only on the single-particle characteristics but also on the so called structure factor. In general, the effect of high filling fractions is that of severely depleting the scattering efficiency. Moreover, especially for smaller particle sizes, high filling fractions impact also the dependence of scattering efficiency on wavelength, and on angle as well. One may avoid those "close packing" effects, by working with filling fractions f≤0.4, such as f≤0.1, or even f≤0.01 such as f=0.001.

The chromatic effect is further based on a number N of nanoparticles per unit area of the chromatic diffusive layer in dependence of an effective particle diameter D=d $n_h$. Thereby, d [meter] is the average particle size defined as the average particle diameter in the case of spherical particles, and as the average diameter of volume-to-area equivalent spherical particles in the case of non-spherical particles, as defined in [T. C. GRENFELL, AND S. G. WARREN, "Representation of a non-spherical ice particle by a collection of independent spheres for scattering and absorption of radiation". Journal of Geophysical Research 104, D24, 31,697-31,709. (1999)]. The effective particle diameter is given in meters or, where specified, in nm.

In some embodiments:

$$N \geq N_{min} = \frac{2.07 \times 10^{-29}}{D^6}\left|\frac{m^2+2}{m^2-1}\right|^2 \text{ [meters}^{-2}\text{]},$$

(D given in [meters]) and $$N \leq N_{max} = \frac{1.21 \times 10^{-27}}{D^6}\left|\frac{m^2+2}{m^2-1}\right|^2 \text{ [meters}^{-2}\text{]; for example,}$$

$$N \geq N_{min} = \frac{4.24 \times 10^{-29}}{D^6}\left|\frac{m^2+2}{m^2-1}\right|^2 \text{ [meters}^{-2}\text{] and}$$

$$N \leq N_{max} = \frac{9.27 \times 10^{-28}}{D^6}\left|\frac{m^2+2}{m^2-1}\right|^2 \text{ [meters}^{-2}\text{], more specifically}$$

$$N \geq N_{min} = \frac{8.99 \times 10^{-29}}{D^6}\left|\frac{m^2+2}{m^2-1}\right|^2 \text{ [meters}^{-2}\text{] and}$$

$$N \leq N_{max} = \frac{6.48 \times 10^{-28}}{D^6}\left|\frac{m^2+2}{m^2-1}\right|^2 \text{ [meters}^{-2}\text{]}.$$

For example, for embodiments aiming at simulating the presence of a pure clear sky, $$N \geq N_{min} = \frac{2.07 \times 10^{-29}}{D^6}\left|\frac{m^2+2}{m^2-1}\right|^2 \text{ [meters}^{-2}\text{]},$$

(D given in [meters]) and $$N \leq N_{max} = \frac{3.69 \times 10^{-28}}{D^6}\left|\frac{m^2+2}{m^2-1}\right|^2 \text{ [meters}^{-2}\text{] such as}$$

$$N \geq N_{min} = \frac{4.24 \times 10^{-29}}{D^6}\left|\frac{m^2+2}{m^2-1}\right|^2 \text{ [meters}^{-2}\text{] and}$$

$$N \leq N_{max} = \frac{2.79 \times 10^{-28}}{D^6}\left|\frac{m^2+2}{m^2-1}\right|^2 \text{ [meters}^{-2}\text{], more specifically}$$

$$N \geq N_{min} = \frac{8.99 \times 10^{-29}}{D^6}\left|\frac{m^2+2}{m^2-1}\right|^2 \text{ [meters}^{-2}\text{] and}$$

$$N \leq N_{max} = \frac{2.06 \times 10^{-28}}{D^6}\left|\frac{m^2+2}{m^2-1}\right|^2 \text{ [meters}^{-2}\text{]}.$$

In other embodiments aiming at minimizing the contribution of a specular reflected scene, $$N \geq N_{min} = \frac{2.79 \times 10^{-28}}{D^6}\left|\frac{m^2+2}{m^2-1}\right|^2 \text{ [meters}^{-2}\text{]},$$

(D given in [meters]) and $$N \leq N_{max} = \frac{1.21 \times 10^{-27}}{D^6}\left|\frac{m^2+2}{m^2-1}\right|^2 \text{ [meters}^{-2}\text{] such as}$$

$$N \geq N_{min} = \frac{3.69 \times 10^{-28}}{D^6}\left|\frac{m^2+2}{m^2-1}\right|^2 \text{ [meters}^{-2}\text{] and}$$

$$N \leq N_{max} = \frac{9.27 \times 10^{-28}}{D^6}\left|\frac{m^2+2}{m^2-1}\right|^2 \text{ [meters}^{-2}\text{], more specifically}$$

$$N \geq N_{min} = \frac{4.85 \times 10^{-28}}{D^6}\left|\frac{m^2+2}{m^2-1}\right|^2 \text{ [meters}^{-2}\text{] and}$$

$$N \leq N_{max} = \frac{6.48 \times 10^{-28}}{D^6}\left|\frac{m^2+2}{m^2-1}\right|^2 \text{ [meters}^{-2}\text{]}.$$

With respect to those physical parameters and their general interplay, it is again referred to, for example, WO 2009/156348 A1.

The macroscopic optical properties of the chromatic diffusing layer disclosed herein can be described in terms of the two following quantities:

(i) The monochromatic normalized collinear transmittance T(λ), defined as the ratio between the transmittance of the chromatic diffusing layer, without the contribution of scattered light—e.g. regular transmittance, and the transmittance of a reference sample identical to the chromatic diffusing layer except for the fact that the diffusing layer does not contain the nanoparticles having a size in the range from 10 nm to 240 nm, i.e. the nanoparticles which are responsible of preferentially diffusing the short wavelengths of the impinging radiation.

(ii) The ratio γ between the blue and the red optical densities defined as: γ≡Log [T(450 nm)]/Log [T(630 nm)] that measures the capacity of the chromatic diffusing layer to provide chromatic separation between long and short wavelength components of the impinging radiation.

In some embodiments, the chromatic diffusing layer may have:

T(450 nm) in the range from 0.05 to 0.95, for example from 0.1 to 0.9 such as from 0.2 to 0.8. For example for embodiments aiming at simulating the presence of a pure clear sky, T (450 nm) may be in the range from 0.4 to 0.95, for example from 0.5 to 0.9 such as from 0.6 to 0.8.

In embodiments aiming at reducing (e g minimizing) the contribution of a specular reflected scene, T (450 nm) may be in the range from 0.05 to 0.5, for example from 0.1 to 0.4 such as 0.2 up to 0.3.

With respect to the ratio γ between the blue and the red optical densities in some embodiments, γ may be in the range 5≥γ≥1.5, or even 5≥γ≥2, or even 5≤γ≤2.5 such as 5≥=≥3.5.

For completeness, inorganic particles may be used such as those that include but are not limited to ZnO, $TiO_2$, $ZrO_2$, $SiO_2$, and $Al_2O_3$ which have, for example, an index of refraction $n_p$=2.0, 2.6, 2.1, 1.5, and 1.7, respectively, and any other oxides which are essentially transparent in the visible region. In the case of inorganic particles, an organic matrix or an inorganic matrix may be used to embed the particles such as soda-lime-silica glass, borosilicate glass, fused silica, polymethylmethacrylate (PMMA), and polycarbonate (PC). In general, also organic particles may be used. For the types of materials, it is further referred to EP 2 304 478 A1.

The shape of the nanoparticles can essentially be any, while spherical particles are most common.

As mentioned above, the nanoparticles and/or the matrix and/or further embedded particles may not—or may only to some limited extent—absorb visible light. Thereby, the luminance and/or the spectrum (i.e. the color) of the light exiting the chromatic diffusing layer may only be very little or not at all affected by absorption. An essentially wavelength-independent absorption in the visible spectrum may be acceptable.

Referring again to FIGS. 3A and 3B, on collimation unit 45, chromatic diffusing layer 27 may be directly applied, for example as a continuous layer. In some embodiments, chromatic diffusing layer 27 may be provided on a support board such as a, e.g. planar, plastic, such as polymeric, or glass board. In other embodiments, the chromatic diffusing layer may be configured strong enough to act as a support for the luminaire and in particular the collimation unit 45 or a part thereof. As discussed above, chromatic diffusing layer 27 is constructed such that it preferentially scatters short-wavelength components of incident light from collimation unit 45 with respect to long-wavelength components of incident light from collimation unit 45. The scattered light is referred herein as diffuse light 31 and it is associated with a blue (short-wavelength) color assuming a given selection of the scattering conditions of the nanoparticles.

In an exemplary viewing direction 73 of an observer is indicated. In viewing direction 73, an observer will see the portion of diffuse light 31 that is emitted in his direction because diffuse light 31 is essentially homogenously emitted in all directions from chromatic diffusing layer 27. Clearly, those portions being emitted towards light source 25, e.g. collimation unit 45, may be lost or partly quasi randomly reflected. In addition, the observer may see—depending on his position—several direct light beams 29 of the transmitted light of light source 25. Light beams 29 are perceived as a common main light beam (see FIG. 3C and related description) and are, for example, "yellowish" with respect to the spectrum of the light of the light source due to the scattering of the blue components. The seen transmitted light is based on that portion of incident light that is directed to or to some extent redirected by chromatic diffusing layer or some forward scatter to face viewing direction 73 of the observer.

As a consequence of the embedded nanoparticles, that portion of the incident light, which is transmitted without being deviated by scattering interaction with chromatic diffusing layer 27, has a visible spectrum that differs from the spectrum of the incident light in an associated center of mass-wavelength because the spectrum is shifted towards longer wavelengths (i.e. to the red giving a yellow tone). The portion of the incident light, which is subject to the essentially Rayleigh-like scattering by the nanoparticles, is emitted in a diffuse manner, thereby leading to substantially homogeneous luminance in all the directions pointing away from its surface.

Figure 3D:
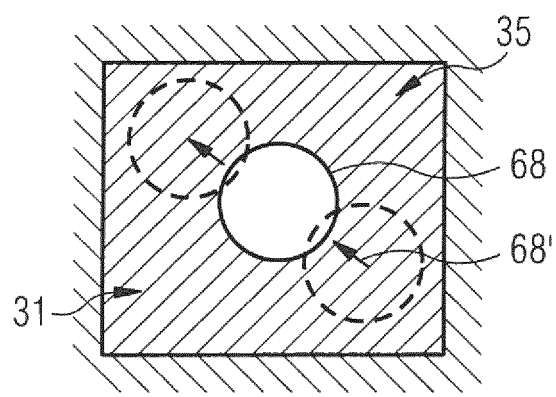
FIG. 3D is a schematic illustration of the appearance of the luminaire of FIGS. 3A and 3B when looked at from below.

In connection with FIGS. 3C and 3D, the appearance of luminaire 21 of FIGS. 3A and 3B is explained. Specifically, FIG. 3C illustrates a schematic 3D-view of a room 60 being illuminated with luminaire 21, while FIG. 3D illustrates the appearance of luminaire 21 within aperture 35 when looked at from below.

Diffuse light 31 is primarily generated by the light emerging from collimation unit 45. Diffuse light 31 will always be seen when looking at aperture 35.

In addition, FIG. 3C illustrates a main light beam 66 originating from aperture 35 of luminaire 21 and propagating along main light beam propagation axis 67. Main light beam 66 is composed of a plurality of sub-light beams, i.e. the direct light beams 29, two of which are illustrated for illustration purposes although those direct light beams would not be resolvable with in main light beam 66 during operation.

As already illustrated in FIG. 3B, direct light beams 29 also propagate along the direction of main light beam propagation axis 67, if one assumes proper alignment of the components of light source 21.

Together, light beams 29 form an essentially constant luminance distribution over aperture 35 for main light beam 66. The divergence of main light beam 66 is substantially similar to the divergence of light beams 29, assuming a more or less homogeneous directionality of light beams 29.

An observer 70 positioned within main light beam 66 will see the direct light of those direct light beams 29 for which the divergence and the position with respect to aperture 35 results in light falling into the eyes of observer 70.

Referring to the sun imitation concept illustrated in particular in FIG. 3D, observer 70 sees a bright disk 68 (perceived as the "sun" under respective conditions such as high luminance peak, respective limited divergence, homogenous blue background) surrounded by a weaker homogeneous bluish background light (perceived as the "sky"), i.e. diffuse light 31. Due to the limited divergence of light beams 29 (beam angle in the range of, for example, below 4°) and the fact that the angular content is basically the same across the whole output surface of the luminaire, the sun will appear to move over the sky (as indicated by arrow 68' in FIG. 3D, i.e. the sun follows observer 70 as for the real sun) when observer 70 moves across room 60, specifically across main light beam 66 as indicated in FIG. 3C by arrow 70'.

In other words, aperture 35 delimits a surface over which at each point the angular emission is narrow with an almost constant luminance (power per unit area per unit solid angle) over the surface. Neglecting for the following considerations chromatic diffusing layer 27, putting a screen in close proximity to aperture 35 will indicate a near field distribution, while putting the screen far from luminaire 21 will show a far field of light source 21. In the near field, a spot of the same size as the aperture 35 is formed that is homogeneously illuminated. In the far field, a spot with essentially the shape determined by the angular content of the light passing the aperture 35 would be formed on the screen (e.g. a round shape if the light is emitted inside a cone to mimic the sun).

In the cases of FIG. 3C, main light beam 66 will fall on the floor essentially in under near field conditions such that the shape of line 72 (indicating the transition to the shadow outside main light beam 66) is a rounded rectangle, i.e. a rectangle with slightly rounded corners. Similarly, the shape of light beams 29 is indicated to have developed according to a conical distribution of light directions towards a circular beam cross-section, however, for typical indoor propagation distances, as said before the overall shape of main light beam 66, in which the contributions of each single light beam 29 is not resolvable, is essentially closer to the nearfield distribution. The embodiments disclosed herein may allow to have, inside each collimated light emitting region, the same angular content at each point. For example, this may roughly (almost) be true for the case of a lens forming an image at infinity of a source in its focal plane, or a CPC.

The near field distribution is the illuminance (power per unit area) distribution impinging on chromatic diffusing layer 27. As the angular emission of diffuse light from chromatic diffusing layer 27 is the same for each of its points (approximatively Lambertian emission), the luminance of the "sky" is directly proportional to this illuminance distribution. Therefore, in order to have a uniform "sky", the illuminance distribution in correspondence of chromatic diffusing layer 27 should be homogeneous on the spatial scale resolvable by the observer's eye.

If the angular content of light beams 29 is quite large (e.g. a cone of ±5° or) ±10°, a localized non-uniformity quickly mixes up during propagation and such non-uniformities may have been "washed away" already a few centimeter or millimeter in front of aperture 35. However, as for sun imitation, the angular content is selected to be very narrow (e.g. a cone of ±2° or less such as ±1°), possible non-uniformities may require larger propagation distances to "wash away". Thus, in general the illuminance distribution should be as smooth as possible.

In the following, various components and configurations of the light source are described in connection with the respective figures.

Referring to FIG. 4A to 4M, the light emitting units are the primary light sources for the luminaire and may be coupled to a lateral side of the light guide unit. The coupling may be performed in various manners that depend inter alia on the type of the light emitting unit and on the type of the light guide unit. In general, the light is coupled into the light guide unit such that TIR occurs for light propagation within the light guide unit.

For example, as shown in the schematic side views of FIGS. 4A to 4D for LEDs as primary light sources, LEDs may be edge-coupled to a light guide unit in several ways. An LED 81A, 81B may be encapsulated using a refractive optic (FIG. 4A) or a reflective optic (FIG. 4B) for coupling to light guide unit 43, respectively. An LED 81C, 81D may be non-encapsulated and use a refractive (FIG. 4C) or reflective optic (FIG. 4D) for coupling to light guide unit 43, respectively. Furthermore, a non-encapsulated LED 81E may be butt-coupled to light guide unit 43 (FIG. 4E).

In some embodiments, the primary light source may comprise laser diodes, in which case a collimating element may not be required. For example, a laser diode 83A may be butt-coupled to light guide unit 43 (FIG. 4F). However, other optical elements such as an anamorphic prism pair (not shown) may be used to condition the radiated laser beam in some desirable fashion (e.g., elliptical to circular beam shape).

In those embodiments, an LED or laser diode emission is provided that is, for example, symmetric with respect to the plane of light guide unit 43 when being coupled thereto. Exemplarily, a main propagation direction 85A prior the coupling is indicated in FIG. 4A that is parallel.

As will be explained below, selecting a respective directionality of the light being coupled into light guide unit 43 may further improve how much light can be coupled out. For that purpose, instead of providing an LED or laser diode emission that is symmetric (for example essentially parallel) with respect to the plane of light guide unit 43 when being coupled thereto, a main propagation direction prior the coupling may be provided that is tilted with respect to the main propagation direction within light guide unit 43, e.g. the plane of light guide unit in a panel-type embodiment.

For example, an LED 81F may be non-encapsulated and use a refractive optic (FIG. 4G) for coupling to light guide unit 43 under an angle that essentially is close to the TIR angle. Similarly, a laser diode 83B may be butt-coupled to light guide unit 43, where a lateral side 87A may be tilted with respect to the plane of light guide unit 43 (FIG. 4H) or a lateral side 87B may connect main front face 55A and main back face 55B orthogonally with respect to the plane of light guide unit 43 (FIG. 4I). Further details on this change in the input light central direction of the primary sources are disclosed in connection with FIGS. 9A to 9C.

As mentioned above, the light emitting units may be emitting in a wide spectrum (white light LEDs) or in narrow spectra. In the latter case, they need not be all of similar emission wavelength. For example, different sets of primary LEDs (for example three sets) might be interlace coupled along light guide unit 43 in order to provide color tunability.

For example, FIGS. 4K and 4L show a top view on a panel shaped light guide unit 43 receiving light from three types of LEDs 89. For example, LEDs 89 might be blue-, green-, red-, or even white-emitting to provide wide color gamut tunability.

In similar embodiments, laser diodes 90 with different emission wavelengths might be used as shown schematically on FIG. 4L.

Of course, higher number categories of primary sources may be used, including 4-primary colors (e.g. blue, green, amber, red) or 5-primary colors (e.g. violet, cyan, green, amber, red), or more.

The primary light sources may be 100% direct-emitting, or might involve down-conversion material. For example, amber-emitting LEDs based on down-conversion are commercially available (LXZ1-PLO2 by Lumileds); also, various white-emitting LEDs are available.

Example configurations of primary light sources and down-conversion materials are listed below in Table I. Each of the light sources is a candidate as a primary emitter coupling into the light guide unit as described above. Each of the down-conversion materials can be used to down-convert the primary light prior coupling into the light guide unit (e.g. creating a white light primary source) or can be used as a candidate to be incorporated as a secondary light source receiving light from the light guide unit and emitting down-converted light to the collimating element. Examples described herein are the down-conversion disks provided on the light guide unit or at the input side of a CPC or TIR lens.

There are many other combinations possible that are not listed in the Table I. In Table I, various visible-spectrum color regimes are referred to according to peak emission wavelengths, as follows: violet 400 nm to 440 nm, blue 440 nm to 480 nm, cyan 480 nm to 510 nm, green 510 nm to 550 nm, yellow 550 nm to 580 nm, amber 580 nm to 610 nm, and red 610 nm to 700 nm.

Moreover, for white light sources, chromatic effects of absorption in the light guide unit as well as chromatic reflective effects may influence the perception in particular of the color of the direct light beams. For example, the reflection at the lateral faces or at the respective LED/laser diode may have a chromatic absorption-like effect in the spectrum within the light guide unit. The emission spectrum of the primary sources and generally the spectrum of the light interacting with the extracting features may be adapted to the material chromatic absorption as well as any chromaticity of the reflection. To compensate for those wavelength dependent effects within the wave-mixing guide configuration, one may tailor the input spectrum accordingly. Specifically, one may tailor the input spectrum in order to have an output spectrum with high CCT, high color rendering index, and R9 values. For example, one may shift the spectrum of a single source (or of multiple sources, if multiple sources contribute to the light being present at the extraction feature) towards the violet (with increased blue and red components) to compensate for an absorption concerning chromatic components.

however also be applicable independently from sunlight imitation if, for example, directed light in the manner discussed herein is needed in some other spectral property or, for example, without the effect of the Rayleigh-like type diffuser.

Referring to the reflection mode, FIG. 5A illustrates a first embodiment of a down-conversion based configuration 101 in the region of a single light source region of many light source regions provided on light guide unit 43. Specifically,

TABLE I

Example configurations of primary light sources and down-conversion materials.

| | | Violet | Blue | Cyan | Green | Yellow | Amber | Red | |
|---|---|---|---|---|---|---|---|---|---|
| Blue-pumped 1-Phosphor | B1P | n/a | LED or LD | n/a | Phosphor 1 | | n/a | n/a | e.g., Blue LED + YAG |
| Blue-pumped 2-Phosphor | B2P | n/a | LED or LD | n/a | Phosphor 1 | | n/a | Phosphor 2 | e.g., Blue LED + YAG + CASN |
| Blue, Green, and Red Emitters | BGR | n/a | LED or LD | n/a | LED or LD | n/a | n/a | LED or LD | e.g., Blue and Green InGaN LEDs and Red AlGaInP LED |
| Violet-pumped 1-Phosphor | V1P | LED or LD | n/a | n/a | Phosphor 1 | | n/a | n/a | e.g., Violet LED + BaSrSiO:Eu |
| Violet-pumped 2-Phosphor | V2P | LED or LD | n/a | n/a | Phosphor 1 | | n/a | Phosphor 2 | e.g., Violet LED + BaSrSiO:Eu + CASN |
| Violet-pumped 3-Phosphor | V3P | LED or LD | Phosphor 1 | n/a | Phosphor 2 | | FGn/a | Phosphor 3 | e.g., Violet LED + BaMgAlO:Eu + BaSrSiO:Eu + CASN |
| Blue-pumped 1-Phosphor + Red | B1PR | n/a | LED or LD | n/a | Phosphor 1 | | n/a | LED or LD | e.g., Blue LED + YAG + AlGaInP LED |
| Blue-pumped 1-Phosphor + Amber | B1PA | n/a | LED or LD | n/a | Phosphor 1 | | LED or LD | n/a | e.g., Blue LED + YAG + Amber LED |
| Blue-pumped 1-Phosphor + Amber + Red | B1PAR | n/a | LED or LD | n/a | Phosphor 1 | | LED or LD | LED or LD | e.g., Blue LED + YAG + Amber and Red LEDs |
| Four Primary Emitters | BGAR | n/a | LED or LD | n/a | LED or LD | n/a | LED or LD | LED or LD | e.g., InGaN blue and green ,AlGaInP amber and red |
| Five Primary Emitters | BCGAR | n/a | LED or LD | LED or LD | LED or LD | | n/a | LED or LD | LED or LD | e.g., InGaN blue, cyan and green, AlGaInP amber and red |
| Six Primary Emitters | VBCGAR | LED or LD | LED or LD | LED or LD | LED or LD | | n/a | LED or LD | LED or LD | e.g., InGaN violet, blue, cyan and green, AlGaInP amber and red |

FIG. 4M illustrates schematically the coupling of light in a specific type of light guide unit that comprises a sequence of light guide strips 91. For example, light guide strips 91 extend parallel with respect to each other. Each light guide strip comprises opposing lateral end faces (all lateral faces together at one side may be understood as lateral coupling face 47. In FIG. 4M, the configuration having one laser diode or one LED per light guide strip 91 is indicated (schematic laser diodes 93A in dashed lines). However, multiple light guide strips 91 (neighboring or interlaced) may be connected by some light guiding fiber-and-splitter structure 95 to a single laser diode 93B, or single LED.

The light source regions may be defined by light that has been actively taken out of the TIR travelling through the light guide unit at the main back face (herein referred to as reflection mode) or at the main front face (herein referred to as transmission mode). In general, light source regions may be disk-like shaped or may have many other shapes.

In general, operational modes are either based on narrow spectral primary light using down-conversion to generate a broad white spectrum or are based on broad white light primary sources that already essentially contain all colors needed to resemble the sky-sun-like illumination. In general, the herein described concepts of the light source may a disk-like down-converting material 103 is deposited on main back face 55B of light generating unit 43 (i.e. opposite the light emitting main front face 55A). Material 103 accepts e.g. short wavelength light from light guide unit 43, converts that light into a broad spectrum of wavelength, and then emits down-converted light back inter alia towards light guide unit 43. The thickness of material 103 can be increased to that of opacity. Moreover, the backside of material 103 may be attached to a heatsink 105 (e.g. made of Al or Cu) for thermal management. Down-converted light will pass through light guide unit 43 in a region proximal to material 103 and be collected by a collimating optic such as a full refractive CPC lens 107.

In other embodiments (or in addition), material 103 may be a scattering material (or include some scattering material) interacting with, for example, wide spectral light of respective primary sources.

Referring in detail to FIG. 5A, material 103 contains down-conversion materials (and/or material with specific scattering properties). Primary light is coupled into light guide unit 43 from a primary source (not shown) and is guided in light guide unit 43 until it impinges material 103. In FIG. 5A, exemplarily a primary light ray 109 is shown that is converted to new emitted ray 111 that exits light guide unit 43 and is collected and focused/collimated by CPC lens 107. In some other propagation cases, primary light may be converted to a ray 113 (in FIG. 5A travelling to the left), which remains trapped in light guide unit 43. This ray 113 has a chance to escape light guide plate 43 upon impinging another material at another light source region in a further scattering event. In FIG. 5A, this other region is material 103, as shown by ray 115, in this case escaping and being collected and collimated as well by CPC lens 107.

In the geometry of the embodiment shown in FIG. 5A, the thickness of light guide unit 43 drives the diameter and length of CPC lens 107. Specifically, it is desirable to have the light guide thickness as thin as possible. The latter may make laser diodes attractive for this type of geometry because the laser light may be coupled into very thin light guides (even thinner than 10 μm).

As indicated above, material 103 may emit light at the side, i.e. outside of light guide unit (e.g. scattered or emitted light from within the interior of the material due to its finite thickness—for example, phosphor compound layers may be 10 μm or more, or even up to a few hundred μm thick). Therefore, it may be desirable to include a reflective containment structure (not shown) around material 103, e.g. at its back side and the lateral sides to increase the emission back towards light generating unit 43.

With respect to the extent of the light source region on main front face 55A of light guide unit 43 in the embodiment of FIG. 5A, the same is related to the lateral size of material 103, the thickness of light guide unit 43, which define the area on main front face 55A through which light emitted from material 103 can be collected by CPC lens 107. Accordingly, the input size of CPC lens 107 depends similarly on the lateral extension of material 103 and the thickness of light guide unit 43.

FIG. 5B illustrates another embodiment of a reflection mode geometry. Specifically, a plurality of angled reflective structures 117 is incorporated into light guide unit 43. For example, reflective structures 117 may be angled at 45° with respect to the light guide plane defined by light guide unit 43. Those angled surface portions may be coated with a specular reflective material such as a reflective metal (e.g. Ag or Al) or a dichroic stack of layers. This geometry may have the advantage that the in-coupled primary light (which may spread over an angular range within the light guide unit of below 40° such as below or about 30° or 20°, e.g. about 10°) is turned by reflective structure 117 in an imaging manner which preserves etendue. This may allow the final collimation within collimation unit 45 to be completed with a conventional secondary lens structure 119 only (as shown in FIG. 5B9, e.g. without the need for a primary optics such as a CPC lens shown in FIG. 5C.

With respect to the extent of the light source region on main front face 55A of light guide unit 43 in the embodiment of FIG. 5B, the same is related to the lateral size of angled reflective structure 117, the thickness of light guide unit 43, and to some extent by the input divergence of the primary light source which define the area on main front face 55A through which light emitted from angled reflective structure 117 passes.

Referring to FIGS. 5A and 5B and the etendue consideration disclosed herein, as the light source region are defined on the front surface of the light guide unit, those regions may actually be larger than the area of the extracting element (e.g. the area of the angled reflective structure 117 on the back surface) due to the broadening of the "beam" when crossing the light guide unit. Therefore, the ratio between the collected area light source region and the area of the main front face may slightly increase in those embodiments.

In the embodiment shown in FIG. 5C, the primary light is narrow in spectrum (e.g. emitted from a monochromatic source such as a monochromatic LED or laser diode) and thus needs to be down-converted. Accordingly, the embodiment of FIG. 5C represents a mixture of reflective extraction and extraction at the interface to the CPC lens/down-converting material. One may reduce the required amount of phosphor material in order to reduce the finite thickness issues noted earlier. For example, the phosphor material may be placed in a cavity or half-cavity geometry of the CPC lens.

As illustrated in FIG. 5C, a thin (perhaps as low as a single mono-) layer of phosphor compounds 121 is deposited between a CPC lens 123 and light guide unit 43. An exit face 125 of CPC lens 123 may be coated with a dichroic 127 that reflects the primary light wavelengths (e.g. blueish light), thereby returning the light to the phosphor compound and introducing more interaction with the phosphor compound. For example, blue primary light that impinges on the layer of phosphor compounds 121, but is not absorbed (ray 129) is reflected by the blue-reflective dichroic stack back towards phosphor compounds 121.

With respect to the extent of the light source region on main front face 55A of light guide unit 43 in the embodiment of FIG. 5C, the same is related to the lateral size of angled reflective structure 117, the thickness of light guide unit 43, and to some extent by the input divergence of the primary light source which define the area on main front face 55A through which light emitted from angled reflective structure 117 passes. The layer of phosphor compounds 121 is intended to convert the light redirected by angled reflective structure 117, and therefore essentially corresponds to the size of the light source region, although it substantially does not contribute to the light extraction.

In the embodiment of FIG. 5C, CPC lens 123 is only configured to provide for a part of the collimation. A secondary lens array (not shown and in principal similar to secondary lens structure 119 in FIG. 5B) would complete the respective collimating element of collimation unit 45. The secondary lens would result in lateral extensions between individual lenses in the range of the pitch between two light source regions, in this case two reflective structures 117. In this case, light source region 57 could be identified as the layer of phosphor compounds. If light guide unit 53 is thin (with respect to the size of light source region 57) or if the angular fan is narrow, the size of the layer of phosphor compounds 121 is comparable with the size of reflective structure 117.

In a related embodiment similar to the one of FIG. 5C, the primary light may be white light such that no need of down-conversion exist. Accordingly, also the dichroic reflector at the output side of CPC lens 123 is not necessary. Nevertheless, a diffuser acting mainly in the forward direction may be provided at the input side of CPC lens 123 to slightly fill the angular input of CPC lens 123.

Referring to the transmission mode, FIG. 6A illustrates a further embodiment in which a down-converting material 131 is positioned at main front face 55A of light guiding unit 43, e.g. a disk-shaped phosphor compound material is deposited on the light-collecting side. In this case, down-converting material 131 accepts light from light guide unit 43 and converts/emits (or in the embodiment of a scatterer, scatters) the light either back into light guide unit 43, or out of light guide unit 43, e.g. into refractive full CPC lens 133. The size of down-converting material 131 is chosen for optical coupling of light into CPC lens 133. Light emitted (or scattered) out the main back face side of the light guide unit may be redirected back towards the disk by a reflector 135. Such light which would escape out the other side of light guide unit 43, and not through down-converting material 131, should be masked by a light-masking layer 137 in order to avoid unwanted effects of uncontrolled light emerging from main front face 55A, as this might spoil the sun simulation.

Light emitted (or scattered) out of light guide unit 43 from the proximity to down-converting material 131 is down-converted. The down-converted light is then collected by CPC lens 133 acting as the collimating optic as described above. Referring in detail to FIG. 6A, down-converting material 131 contains, for example, down-conversion phosphors and/or scattering properties and has a thickness chosen to maximize light generation into the collimating optic. A primary light ray 139, coupled into light guide unit 43 via a primary source (not shown) is guided in light guide unit 43 until it impinges down-converting material 131, as that acts as a change in index of refraction and thus change in TIR conditions. Primary light ray 139 may be converted to an emitted ray 141 that exits light guide unit 43, and is collected and focused/collimated by CPC lens 133. Another primary light ray may be converted to a new emitted ray 143 which becomes trapped in light guide unit 43. This ray 143 may have a chance to escape light guide unit 43 later upon impinging another down-converting material in a scattering event, as shown by ray 145, in this case escaping and being collected and (partially) collimated by CPC lens 133.

In addition, emitted and or scattered rays 146 may escape light guide unit 43 out the main back face 55B, and may be turned back downward towards the light-emitting side of light guide unit 43 by reflector 135. A mask layer 148 may be used to block light from emitting from light guide unit 43 in a (non-source) area that would not couple into CPC lens 133.

With respect to the extent of the light source region on main front face 55A of light guide unit 43 in the embodiment of FIG. 6A, the same is related to the lateral size of down-converting material 131 and the respective region in which the change in TIR conditions is provided because in that area light can interact with down-converting material 131 and leave light guide 43. The input size of CPC lens 107 depends similarly on the lateral extension of down-converting material 131 and the assumed Lambertian distribution of the down-converted light that is intended to be collected.

FIG. 6B illustrates another transmission mode geometry, wherein the light source regions for emission are provided by an optical coupling 147 of CPC lenses 149 to light guide unit 43. This geometry is attractive because CPC lenses 149 may be mounted in a self-aligned manner to its "source" for collecting light being extracted from light guide unit 43 due to the induced local break of refractive index-mismatch at the optical interface and respective local break in TIR condition. The self-alignment is due to the light source regions being formed by optically coupling the CPC and light guide unit 43.

With respect to the extent of the light source region on main front face 55A of light guide unit 43 in the embodiment of FIG. 6B, the same is related to the lateral size of CPC lens 149 and the induced breakdown of TIR conditions because in that area light leaves light guide 43. The input size of CPC lens 107 is thus essentially the size of the light source region.

Assuming that there is no presence of scattering centers, the light distribution that fills CPC lens 149 depends on the in-coupled primary light ray distribution. Depending thereon, it may be improving the far field light distribution and the sun appearance as a consequence by homogenizing the light distribution in down-stream secondary optics in order to achieve the desired near-field and far-field images of the "sun." For example, one may include some mild (forward, low-angle) scattering centers at the optical element/ light guide unit interface 151.

In addition, as indicated by dotted lines, a reflective structure 117 may additionally be provided to increase the amount of light coupled out at the light source region.

Figure 6C:
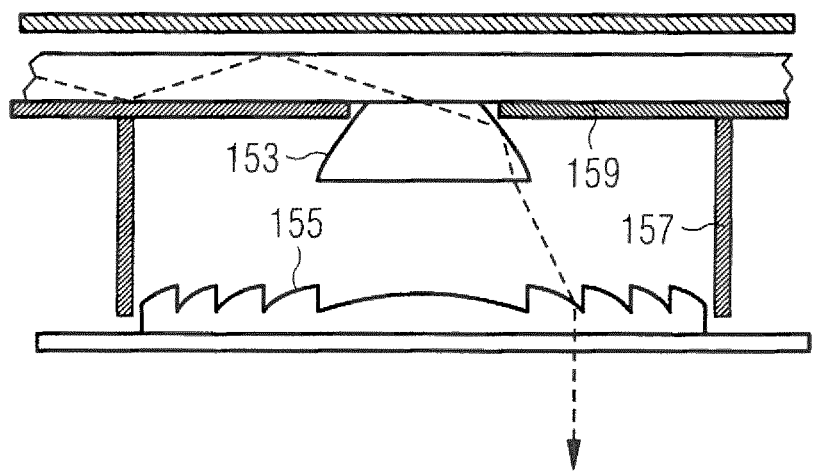

In contrast to the full CPC of FIGS. 6A and 6B, a "short" CPC 153 coupled with a secondary lens 155, e.g. a Fresnel lens, is shown in FIG. 6C. As further shown and applicable to all the herein disclosed embodiments, it may be desirable to include vertical light baffle structures 157 within the lens system to reduce stray light effects—in addition to lateral baffle structures 159 discussed above.

With respect to the extent of the light source region on main front face 55A of light guide unit 43 in the embodiment of FIG. 6C, the same is related to the lateral size of CPC lens 149 as for the embodiment of FIG. 6B.

Figure 6D:
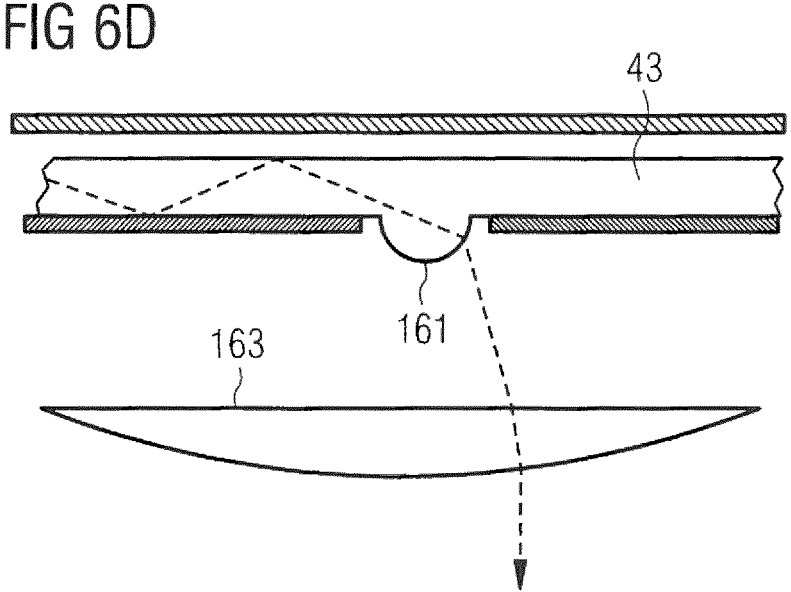

Another transmission mode geometry is schematically shown in FIG. 6D, using a lens to extract light from the light guide unit. In particular, the contacting optical element is a lens structure 161 formed or molded directly into light guide unit 43. This creates an emission surface that can be coupled to a secondary lens structure 163 for final collimation.

With respect to the extent of the light source region on main front face 55A of light guide unit 43 in the embodiment of FIG. 6D, the same is related to the lateral size of lens 161 and the induced breakdown of TIR conditions similar to the embodiments of FIGS. 6B and 6D because in that area light leaves light guide 43. The size of lens 161 is thus essentially the size of the light source region.

In some embodiments related to the one of FIG. 6D, the size and shape of the interface between lens structure 161 and light guide unit 43 may be specifically selected. For example, a cylinder smaller in diameter than the lens may be used to connect the lens to the guide (not shown). The cylinder would act as some sort of mixing rod, or it could contain scattering particle acting mainly in the forward direction to fill the angular gap of incident light which is the input of the lens.

Referring to the herein disclosed fan concept, the propagation inside the light guide unit may be within a narrow angular aperture close to the TIR angle. Then, the angular content impinging on the extracting optics will be centered around that angle close to the TIR angle. Using, forward scattering particles at the input side of any primary optic will increase the filling of both the far field and the near field light distributions. It is noted that for bi- (or more-) directional light propagation within light guide unit, the angular content impinging on the extracting optics will be centered around that angle for both (or more) directions thereby filling the input aperture of the primary optics (lens as well as CPC lens) in a broader manner, thus the far field image may be more homogeneous.

As will be apparent to the skilled person, the illuminance distribution just downstream the secondary lens structure 163, and in general downstream the collimated light emitting region, should be designed to be as uniform as possible, thereby avoiding or at least reducing unwanted lack of uniformity in the appearance if the collimated light emitting regions can be resolved by an observer.

Figure 6E:
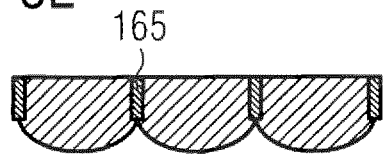
FIG. 6E and FIG. 6F are schematic illustrations of baffle configurations.
Figure 6F:
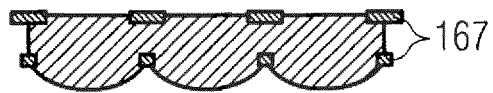

FIGS. 6E and 6F illustrate further implementations of baffle structures 165 and 167 as they may be applied to lens array structures to reduce or even avoid cross-talk between neighboring collimating elements.

Figure 7A:
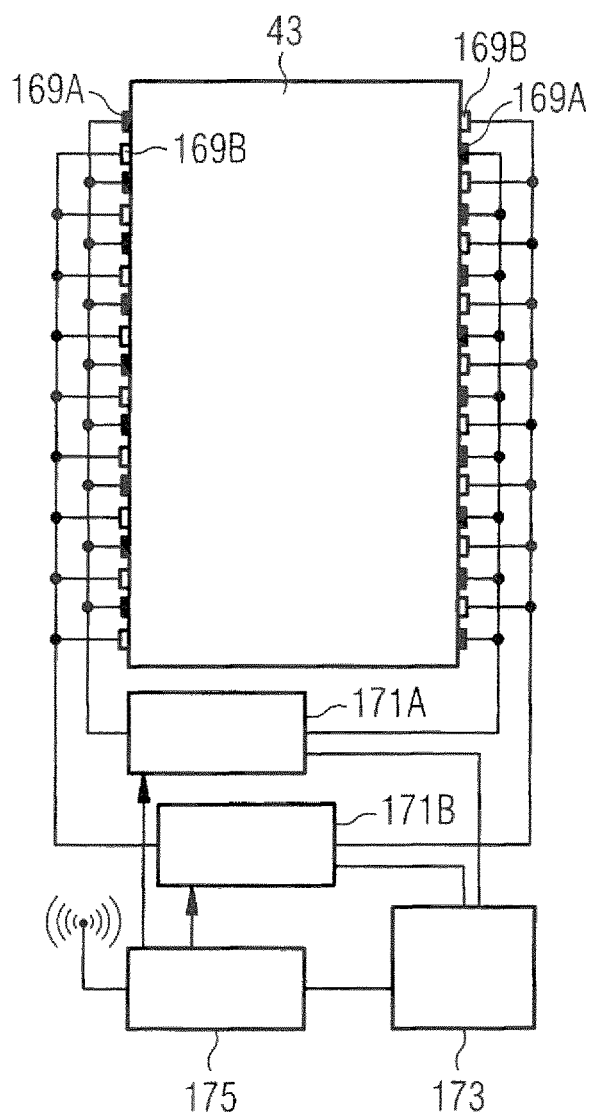
FIG. 7A to FIG. 7C are illustrations of configurations for illustrating color tuning features.
Figure 7B:
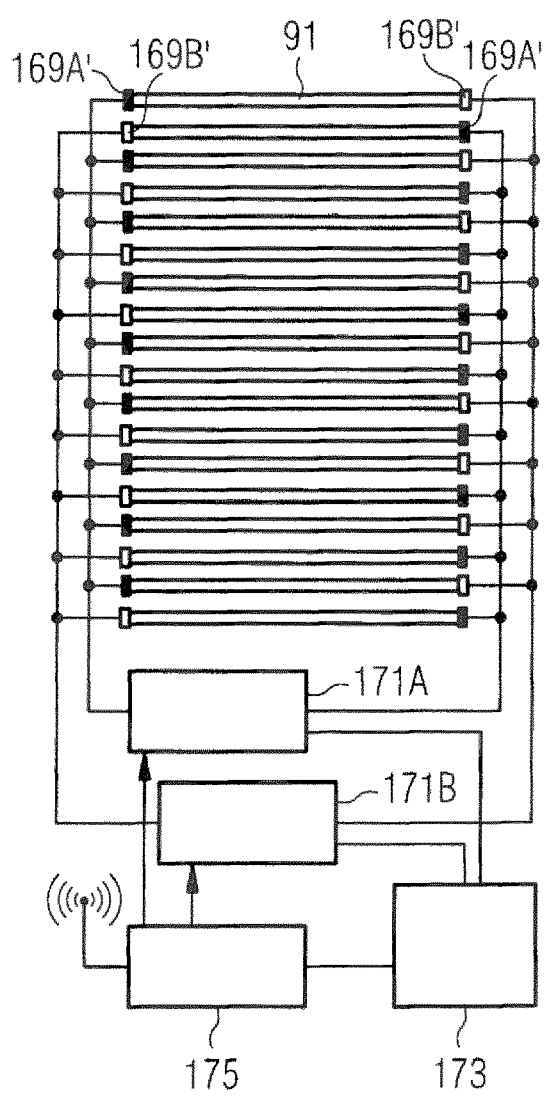

Referring to FIGS. 7A and 7B, a further aspect of this disclosure relates to color changing in the resultant highly directional beam. For example, two or more sets of primary light sources of different colors are coupled to a light guide unit and are operated by separate electronic drivers or driver channels, which are powered by an external power sources (e.g., mains, or batteries).

The exemplary embodiment of a light source shown in FIG. 7A is configured for mixing two different colors in light guide unit 43. The light is generated by two types of light emitting units 169A, 169B. Each type of light emitting units 169A, 169B is operated by a specific driver unit 171A, 171B receiving power from a power supply 173. Within light guide unit 43, the light can interact with, for example, the secondary source "disks" to result in a formation of individual localized light source regions, which may be smaller in size, and well homogenized. The color of the secondary sources may be tuned by changing the driving conditions of driver units 171A, 171B, e.g. by amplitude or pulse-width modulation. In general, the concept is extendable to more types/sets of primary sources, including three, four, five, six, or more sets of primary light emitting units that are controllable via the control system to perform, for example, color balancing or color setting.

The light source designs described in connection with FIG. 7A may be used for providing simulated direct sunlight. The light source may be combined with a Rayleigh-like type diffuser, as described above, to simultaneously generate simulated direct sunlight and (diffuse) skylight. Additional conditioning optics, such as spatial filtering (for reducing or absorbing possible stray light), or turning optics (such as prismatic sheets or tilting/steering optical layers configured to tilt direct light to produce a sun beam at angles different from the orthogonal to the waveguide plane) for directing the high intensity beam at an angle with respect to normal to the luminaire aperture, e.g. for tilting the main light beam propagation axis with respect to the normal to the light guide output window if the collimating unit output light is centered around such direction, may be provided between the light guide unit and/or the diffuser. As described above, the thickness of the overall luminaire may, for example, be further decreased when using a collimating optics for the highly directional beam in the form of Fresnel lenses, or a Fresnel lens array.

In FIG. 7B, a similar implementation of the above color changing concepts is illustrated for light guide units comprising a plurality of light guide strips 91. For example, each light guide strip 91 may be end-coupled with an LED 169A', 169B' at each end. LEDs 169A', 169B' have, however, a different emission color. For example, LED 169A' may be white-emitting while the LED 169B' is amber-emitting.

In the exemplary embodiment of FIG. 7B, the position of the white/amber LEDs 169A', 169B' is alternated as light guide strips 91 are laid out across aperture 35 of the luminaire. Separate driver units 171A, 171B to power the different colored LEDs 169A', 169B' may be used. Moreover, driver units 171A, 171B may be operated according to information provided by a clock/controller 175 which can be networked as described further below.

As shown in FIGS. 7A and 7B, light emitting units may be provided on two opposing sides of the light guide unit, in order to improve uniformity of the light intensity across the aperture of the luminaire. Furthermore, bezels (not shown) may be provided to aperture the light emitting face to avoid visibility of any unwanted light intensity non-uniformities proximal to the edge-coupled light sources.

Figure 7C:
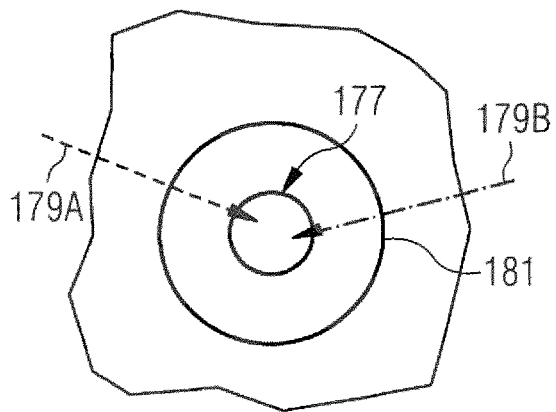

For further illustrating the color mixing, FIG. 7C is a top view of a small portion of the emitting luminaire aperture 35. Light source region 177 for emitting scattered and/or converted light (as described above) accepts rays 179A, 179B, which are collected and redirected by a short CPC lens 181. Rays 179A, 179B may be of different colors. For example, ray 179A may be a white light distribution, and ray 179B might be an amber distribution. Additional rays (not shown) may be added from additional light sources. Some rays may be down-converted by luminescent materials related to that light source region 177 within the disk, while others will be scattered or redirected to short CPC lens 181 without a down-conversion process. For the wide range of combinations of light sources it is referred again exemplarily to Table I.

In the following an embodiment of a luminaire is described in more detail based on the concepts described above.

The luminaire comprises a light guide plate (LGP) having an area sufficient to provide a 2'×4' illuminating aperture. Such LGPs are widely produced today for the display industry as backlights for liquid crystal display (LCD) televisions and monitors. The LGP may be made from polymethyl methacrylate (PMMA), also known as acrylic, and suppliers include companies such Wooyoung, Radiant, Coretronic, Pontex, Kenmos, JinMinShang, GLT, Enplas, and Zeon. While acrylic is very common, it is also possible to make LGPs from more robust materials, even glass. However, unlike for LCD applications, for the luminaire, there is no high-density of extraction features incorporated into the LGP, instead localized light source regions are homogenously distributed over the LGP. A typical thickness for an LGP of the size required here may be 3 mm, but thinner (down to about 1 mm) and thicker (larger 3 mm) configurations may be feasible.

For the generating the light source regions, down-conversion materials are mixed into a suitable binder such as silicone and deposited onto the LGP in a periodic spacing and with uniform size. For example, the down-conversion materials may be dispensed or ink-jet printed to provide disks comprising phosphor grains of green/yellow- and red-emitting phosphor compounds on the LGP. The disk diameters may be targeted at 100 μm, and their pitch in a light emitting direction of the light emitting units may be set to 5.8 mm, resulting in over 20 000 disks deposited on the LGP. Alternatively, the LGP may be temporarily masked according to the pattern above, and the phosphor materials may be spray-coated onto the LGP. After removing the mask, phosphor materials are left behind in the proper form factor. Referring to the in FIG. 5A described reflection mode configuration, the thickness of the disks may be selected for that of opacity, typically larger 10 μm. Or, the disk is backed by a reflective material.

Referring to the transmission mode described in FIG. 6A, the thickness is chosen to optimize light out-coupling, for example in the range of 10 μm to 200 μm. In the various embodiments, the phosphor grain sizes, doping levels, absorption characteristics, and loading density in the binder, determine the relative ratio of collected primary and generated secondary (down-converted) light. The ratio may be suitable tuned to provide the desired spectral characteristics of the luminaire by respective selection of the parameters such as thickness, lateral extension, color mix of primary light sources, and type of down-conversion.

Based on the light source regions, a multi-source lighting system is formed. The efficiency of the multi-source lighting system targeting a particular spectrum can be shown to be:

$$\eta = \left[\sum_{i=1}^{n}\left(\frac{f_i}{\eta_i}\right)\right]^{-1}, \sum_{i=1}^{n} f_i = 1$$

where $f_i$ is the optical power fraction, and m the power conversion efficiency, of the $i^{th}$ source. For a down-converted source, the efficiency must take into account the quantum efficiencies of the phosphors, $\eta_{ph}$, the "quantum deficit" (ratio of primary pump centroid photon energy to that of the down-converted spectrum, typically approximated as the ratio of the peak wavelengths), and the optical losses associated with the conversion, sometime called "package efficiency" (see Krames et al., IEEE J. Display Technol. 3, 160-175, 2007).

For a single primary source pumping a single down-converter, the efficiency may be written as:

$$\eta = \eta_p\left(f_p + f_s\frac{\lambda_s}{\lambda_p\eta_{ph}}\right)^{-1}\eta_o$$

where $\eta_p$ and $f_p$ are the power efficiency and optical power fraction of the primary pump source, respectively, $f_s$ is the targeted optical power fraction of the secondary, or down-converted, light, $\eta_{ph}$ is the quantum efficiency of the down-converter, $\lambda_p$ and $\lambda_s$ are the peak wavelengths of the primary and secondary emission spectra, respectively, and $\eta_o$ accounts for other optical losses via the conversion process. For a typical system targeting "cool white" (correlated color temperature of 4000 K to 7000K), the primary leakage fraction may be about 30%, and for typical phosphor quantum efficiencies of 90%, and assuming other optical losses of about 10%, a peak emission wavelength of 450 nm for the primary source and 560 nm for the down-converter, respectively, one can estimate $\eta \sim 0.7\, \eta_p$. In photometric terms, and for typical lumen equivalents for LED-based spectrum for cool white color temperatures of 340 lm/Wopt, the efficiency can be estimated at $\eta \sim 240\, \eta_p$ 1 m/W. That is, for a primary source efficiency of 50%, an overall light source efficiency including down conversion losses may be about 120 lm/W. Additional optical losses for the LGP/lens array system and electronic driver losses (15%), would result in an overall lower luminaire efficiency. If the LGP/lens array losses may be less than 15%, the overall luminaire efficiency could be above 85 lm/W, thereby meeting, for example, the DLC standard for a 2'×4' commercial indoor luminaire (see DesignLights Consortium™ Product Qualification Criteria, Table 4: Primary Use Requirements).

To obtain, for example, at least 3000 lm in the light emitted by the light emitting units into the LGP, and assuming the optical losses listed above, a total primary light source electrical power of about 30 W or more is required, or about 15 or more optical Watts. This may easily be achieved by using thirty (30) Watt-class high power LEDs. Another alternatively is to under-drive high power LEDs, to increase efficiency and lifetime, and reduce thermal load. For example, along each thinner edge of the LGP, 30 high-power blue-emitting LEDs, such as Lumileds' LXZ1-PR01, may be mounted along with coupling optics to inject their primary light emission substantially into the LGP and within the angle necessary for guiding within the LGP (total of 60 LEDs, each outputting about ¼ optical Watt). Along the other two edges of the LGP, and between each LED, reflective material may be applied to avoid light leakage, in particular in the case of a light guide unit not being configured as an ensemble of light guide strips.

For the collimating optics, a CPC lens array, or short-CPC plus Fresnel lens array, or TIR lens array, or TIR-lens plus Fresnel lens array designed to produce, for example, a 2° beam from the 100 μm diameter sources, is formed or molded for mounting proximal to the LGP. Alignment between the disk sources and Fresnel lenses is performed to optically couple the light source regions with the respective collimating elements.

For an exemplary transmission mode geometry, a reflector may be provided proximal to the upper side (main back face) of the LGP (or applied directly in the case of a low refractive index laminated layer on that side of the LGP). A mask layer, which may be reflective on the top side, but absorbing on the bottom, is attached proximal to the bottom side (main front face) of the LGP (or applied directly in the case of a low refractive index laminated layer on that side of the LGP). In the case where a low refractive index layer is to be provided on the same side as the disks, the laminate may be removed where the disks are to be applied.

The elements above, and in addition a chromatic diffusing layer and (optional) beam-steering optics, may be assembled into a fixture housing and the primary light sources are connected to an electronic driver powered by mains or by a battery system, for example.

When the primary light sources are powered up, their light is converted into secondary sources at the down-converting disks. The generated secondary light then is collected by the lens array and may be steered by the steering optics through the chromatic diffusing layer to provide a sun-like beam (e.g. of about 2° or 4° divergence), and more than 3000 lm, at a color temperature of 4000 K to 7000 K. Moreover, a diffuse light is generated that emulates the sky, and has a much higher color temperature. For the system described in above, the total luminaire thickness would be driven by the LGP thickness (e.g. 3 mm), the collimating lenses (242 mm full CPC, or about 10 mm to 15 mm if short CPC plus Fresnel), the Rayleigh-like type diffuser (e.g. few millimeters), and steering optics (few millimeters). In summary, the total luminaire thickness may be less than 50 mm if, for example, the short CPC lens plus Fresnel lens approach is employed.

In the following an embodiment of a luminaire is described in more detail based on the concepts described above and applying the concept of color tuning.

It is known that high contents of blue light at night may disrupt the human circadian system, leading to health issues such as increased rates of cancer and diabetes, and disturbed sleep patterns (see Stevens, et al., "Meeting report: The role of environmental lighting and circadian disruption in cancer and other diseases" 2007. Department of Neurology, Faculty Papers, http://jdc.jefferson.edu/neurologyfp/22). Thus, in some embodiments of the herein disclosed luminaires, the ability is disclosed to tune the outputted spectra to reduce, for example, the amount of blue light at night.

In addition to the primary blue light sources (for example used in the above described embodiment), yellow or amber emitting LEDs are provided as further light emitting units. For example, amber emitting LEDs are commercially available with the same form factor as the blue-emitting ones described above (see LXZ1-PLO2 from Lumileds). The amber LEDs may be interlaced with the other primary light sources, and have their own separate driver electronics or channel.

Referring to clock/controller 175 shown in FIGS. 7A and 7B, a daytime and/or seasonal clock input can be provided to control the drivers of each set of LEDs, so that the beam in the primary color may be changed in a preferred manner. The controller may be connected to the internet by any number of means, including wired network or wireless (e.g., WiFi, Zigby Radio, Bluetooth, Bluetooth LE, etc.) connection. The internet connection can provide information necessary to properly tuning the light output and color of the luminaire. For example, it might provide time of season and time of day for the location (e.g., GPS) of the luminaire. The location of the luminaire can be set upon installation in the hardware of the controller, or by means of some other type of commissioning.

For example, during the day, the primary blue-emitting light sources are on, and the amber LEDs are off. In the evening, it is the other way around. The observed effect will be the primary beam achieving an extremely warm color temperature, and the reduced scattering of amber photons by the chromatic diffusing layer will mean the "sky" will "darken". Both of these effects are desirable from a circadian point of view as well as from standard design principles for lighting at night.

The lumen output of the amber beam may to be as high as the "sun" beam operating during the day. The amber LEDs may interact with the secondary disk sources not through down-conversion, but via scattering off phosphor particles and/or scattering features provided within the disk region. Thus, they are collected by the collimating optics in the same way that primary and down-converted light is in the case of the "day mode".

It is noted that a similar approach can be used to mimic the presence of the moon, e.g. by choosing a second set of primary light sources that will approximate the lunar emission spectrum upon interaction with the secondary sources. The luminaire can be designed to have any arbitrary transition pattern between day and night modes, by providing suitable scripts based on the clock information provided.

In the above embodiments are examples for configurations that use simultaneously mixing disparate light sources and then collimating the respective output light. That is, the herein disclosed concepts are configured inter alia for combining multiple light sources of varying etendue, colors, and intensities, homogenizing their output, and localizing the output as input into an optical system (collimating element) that then focuses/collimates the output into a single narrow beam of light.

To state another way, the herein disclosed concepts transform various light sources of small emitting area (a few square millimeter or less) and large emission solid-angle into a homogenized light source of large light emitting face (greater than 100 cm$^2$) and small emission solid angle. The small emission solid angle is, for example, less than 8° (full width at half peak) such as less than 4°, or even less than 2°. The large light emitting face may be greater than 100 cm$^2$ such as greater than 0.5 m$^2$ or even larger.

As described for the coupling of the primary light into the light guide unit in context with FIG. 4M, the inventors realized that one may reduce the surface area of the light guide unit with respect to that of the light extracting features (resulting in the light source regions) in order to reduce optical losses within the light guide unit or at its edges.

Figure 8A:
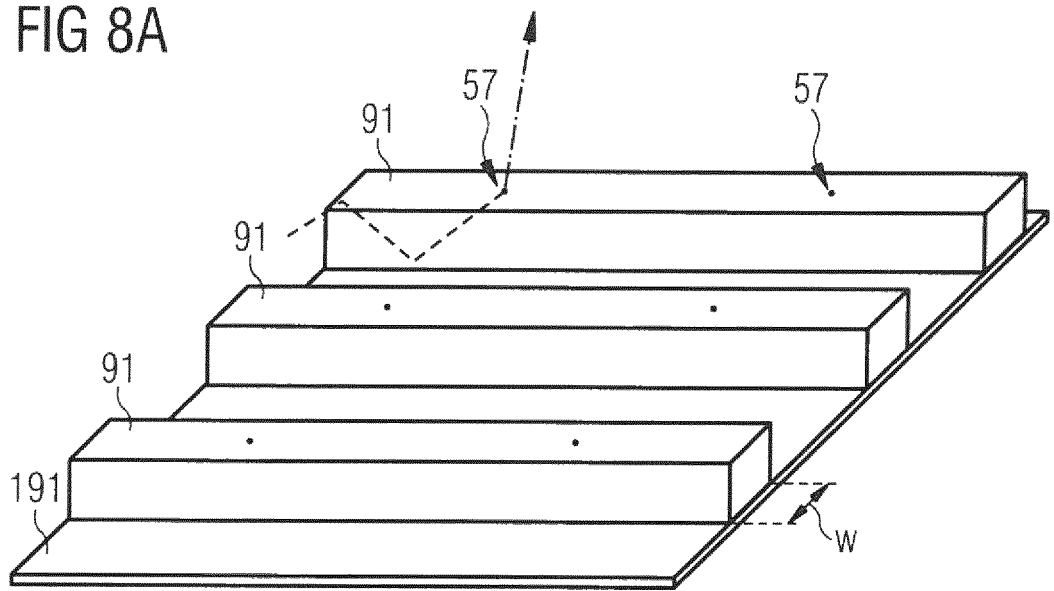
FIG. 8A is a schematic illustration of a portion of a light guide unit comprising light guide strips.

As illustrated in FIG. 8A, for that purpose, the light guide unit may comprise light guide strips 91. Such light guide strips 91 may be mounted to or formed on a large area substrate 191 (larger than the light source regions as an example for a support structure) that has a lower refractive index than that of the light guide material and rigidly supports the thin light guide strips. It is noted that this may change the TIR angular condition, and influence the guided angular distribution configuration. In alternative embodiments, in particular in cases of a structured main back side 55B, a mount configuration may be mechanically connected to strips 91 in a few selected localized points, for example reflective structures may be configured as junction points. The mechanical connection may be performed by a pin-mounting structure that, for example, comprises a series of reflective/metal flat-ended pins supporting the light guide at selected regions. Thereby, unwanted extraction in correspondence to junctions/pins may be prevented or at least reduced. Furthermore, pins may be mounted in opposing (antagonistic) pairs thereby clamping and holding the strip.

For example, considering light source regions 57 of 100 μm diameter linearly displace by a pitch of 5.8 mm along light guide strips 91 and the task to achieve a 2° beam, each light guide strip 91 may be 3×3 mm$^2$ in cross section (or smaller) and run the length (or longer) than the desired length of the luminaire. With this geometry, the fraction of lossy light-guide edge area is reduced essentially, for example by about a factor of two for the specific example described above. Also, the overall mean optical path length of coupled light within the light guide material is reduced. Therefore, losses due to internal absorption of the light guide material are decreased.

Figure 8B:
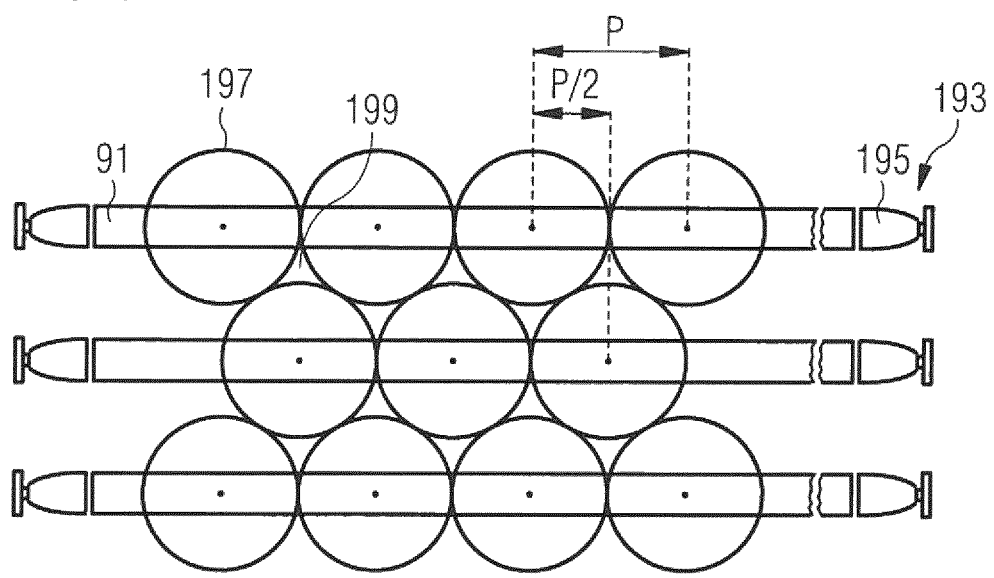
FIG. 8B to FIG. 8D are schematic illustrations of light sources being based on light guide strips.
Figure 8C:
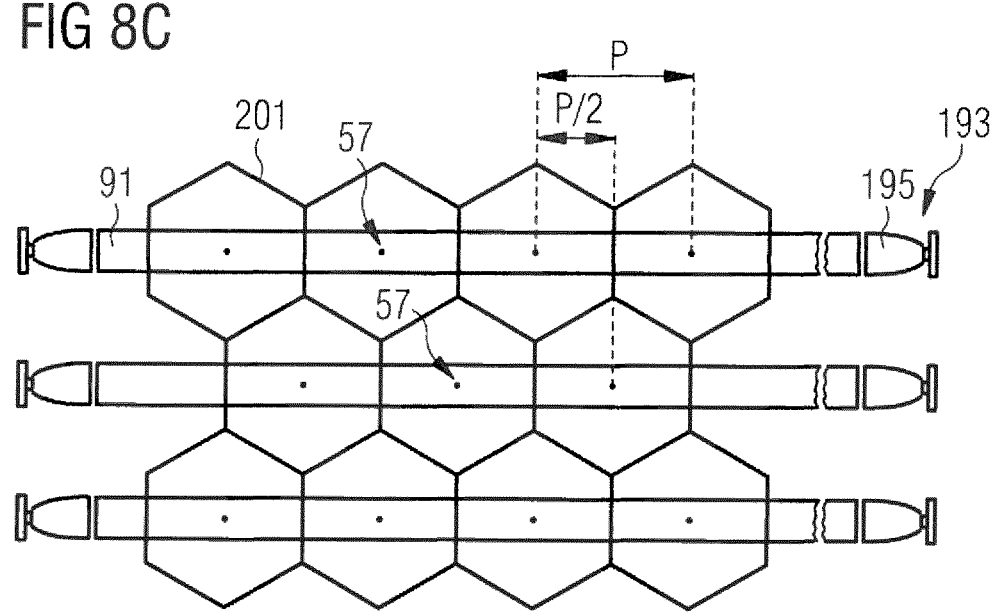
Figure 8D:
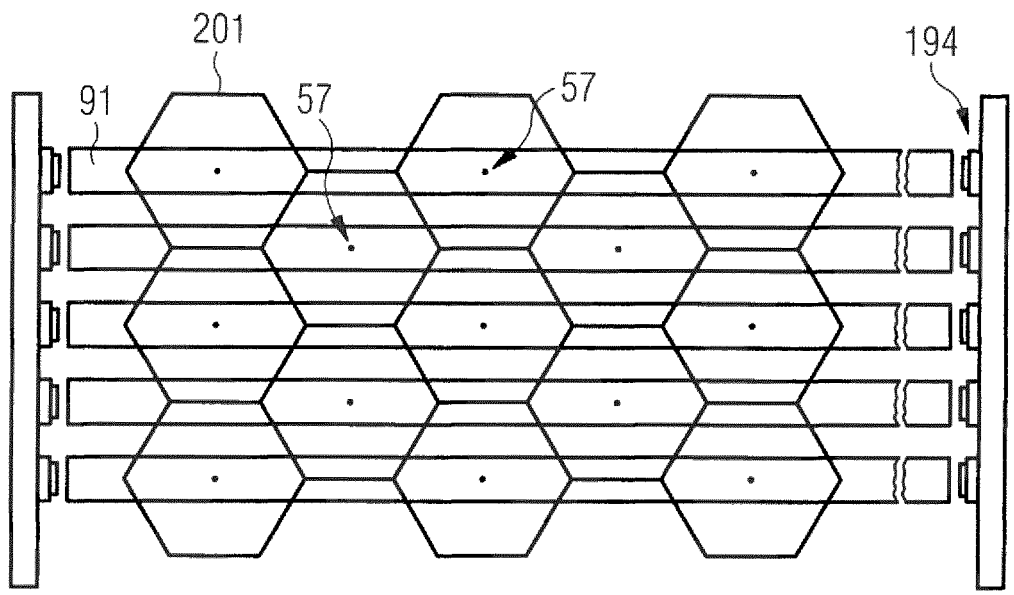

Referring to FIGS. 8B to 8D, exemplary configurations of primary light sources and the collimating unit are schematically indicated. In particular, FIGS. 8B to 8D illustrate the ratios between various elements of the luminaire such as size of light source regions (illustrated as dots), linear strips 91 (distance depending on pitch between light source regions and orientation of collimated light emitting regions, non-emitting regions, etc.

In general, a light emitting unit may be edge coupled to either end of light guide strips 91, see also the alternative shown in FIG. 4M. In the exemplary embodiments of FIGS. 8B and 8C, LEDs 193 are non-encapsulated and use a refractive CPC lens 195 for coupling light into respective light guide strips 91. In the exemplary embodiment of FIG. 8D, non-encapsulated LEDs 194 are butt-coupled to light guide unit 43.

Light source regions 57 are provided periodically along each strip 91 at a pitch p. However, light source regions 57 may be shifted between neighboring strips 91, for example, by half a pitch, i.e. by half the distance between two light source regions 57.

The light from each light source region 57 is collimated by a collimating element that receives light emerging from a respective light source region and emits collimated light from a respective collimated light emitting region.

Referring specifically to exemplary embodiment of FIG. 8B, collimated light emitting regions 197 are shaped circular and located concentric with the respective light source region 57. Accordingly, areas 199 that do not emit light are formed in-between collimated light emitting regions 197 on the light emitting face of the light source. Herein, areas 199 are also referred to as non-emitting regions.

Referring specifically to the exemplary embodiments of FIGS. 8C and 8D, collimated light emitting regions 201 are shaped hexagonal and located concentric with the respective light source region 57. The hexagonal shape allows the formation of a light emitting face that is essentially free of areas that do not emit light. The hexagonal shape may be a respectively cut lens or a respectively formed CPC lens. It is noted that small areas in-between collimated light emitting regions 201 may remain that do not be emitting light due to structural implementations of the collimating elements.

In an exemplary configuration, full fan LEDs are butt-coupled to small light guide strips 91 similar to the configurations in FIGS. 4E and 8D. Such configuration may be a simple implementation from a manufacturing point of view having an efficiency that can be reasonably high. For example, for a 0.25 mm×0.25 mm LED and a light guide strip with a cross-section of 0.3 mm×0.3 mm, an output of about 74.8% was simulated with about 24.8% being absorbed at the LED faces and about 0.4% being absorbed by the PMMA light guide (assuming 20% absorption at the LED faces). The extraction took place at light source regions having a diameter 100 μm (assuming 100% extraction when a light ray hits the light source region) and the pitch between linearly aligned light source regions was 2.9 mm allowing a beam divergence down to 4°.

In similar exemplary configurations, full fan LEDs are coupled to small light guide strips 91 of about 60 cm length with a cross-section of 0.3 mm×0.3 mm by means of an optical pyramid configuration. For a 0.25 mm×0.25 mm LED, an output of about 75.6% was simulated for light allowing a beam divergence of 2° under etendue considerations with about 23.7% being absorbed at the LED faces and about 0.7% being absorbed by the PMMA light guide (assuming 80% diffuse reflection at the LED faces). The extraction took place at light source regions having a diameter 100 μm (assuming 100% extraction when a light ray hits the light source region) and the pitch between linearly aligned light source regions was 5.8 mm. For a 4° beam divergence and a respective pitch of 2.9 mm, an output of about 81.7% was simulated with about 17.9% being absorbed at the LED faces and about 0.4% being absorbed by the PMMA light guide. Along the light guides, the Illuminance distribution just outside the light source region varies in an acceptable range such as down to 70% in the center of the light guide for the 2° configuration.

For completeness, it is referred again also to FIG. 3A illustrating square shaped collimated light emitting regions 61. While in FIG. 3A no shift between the positions of the light source regions on neighboring strips 91 is indicated, in particular the square shape allows for selecting various shifts without introducing additional non-emitting regions to the light emitting face.

As will be understood by the skilled person based on the herein disclosed concepts, multiple colors may be provided, for example, by having different color emitting light emitting units at either end of each strip 91. Alternatively, the colors of light emitting units may be varied strip 91 by strip 91 in embodiments having a pitch that is not resolvable by an observer by eye in a usual observer condition, e.g. for a very narrow pitch. In some embodiments, more primary light sources per strip 91 may be added if the width W of strips 91 is allowed to increase.

Figure 9A:
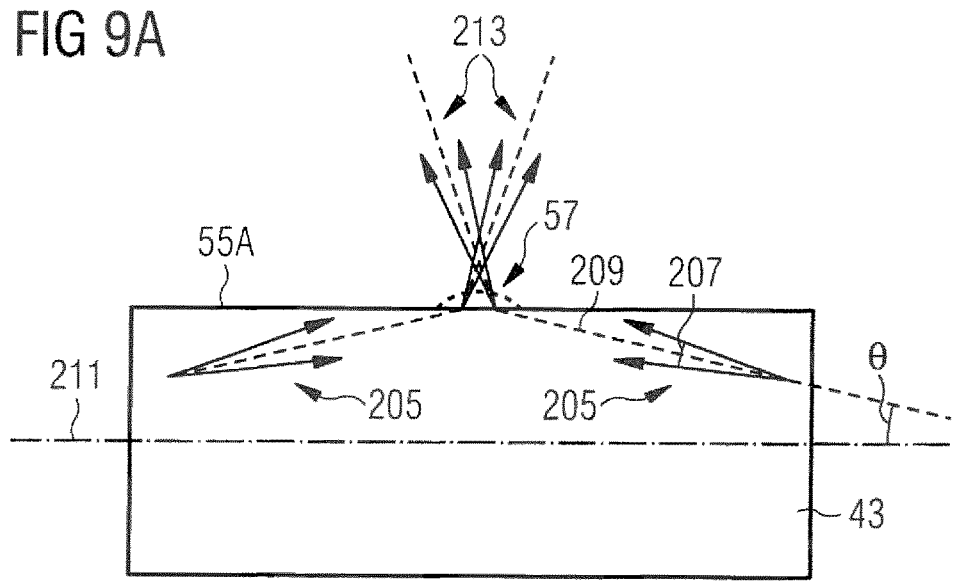
FIG. 9A to FIG. 9C illustrate configurations using primary light that is in a fan-like manner, and in particular tilted with respect to a central axis of the light guide unit, provided the light guide unit.
Figure 9B:
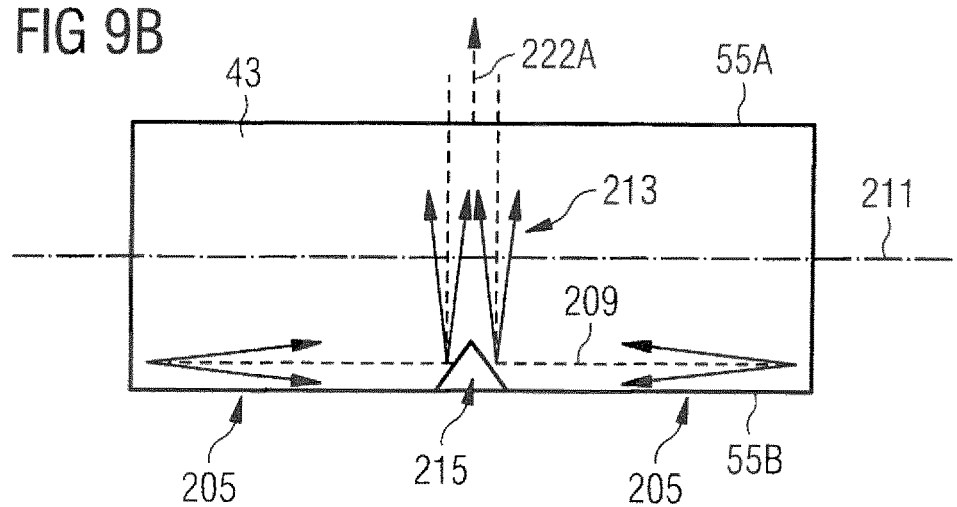
Figure 9C:
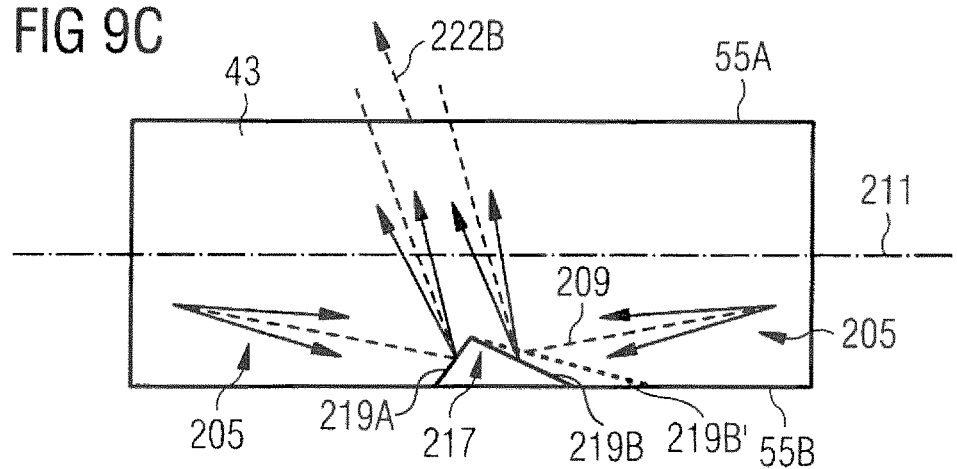

FIGS. 9A to 9C illustrate the concept of coupling a narrower angular fan into the light guide unit. In general, a narrower angular fan may be combined with a tilt of the input light central direction. It was found that in some configurations the use of a less divergent beam as input may increase extraction efficiency. The tilted angular fan may be conical (i.e. symmetric around its input light central direction) or asymmetric (e.g. adapted to the shape of the light guide strip). For the extraction, the tilt and fan in the plan orthogonal to the main front/back face is considered to be of primary interest and is shown in the following figures schematically.

FIG. 9A illustrates the fan concept for a transmission mode configuration, that is, for example, similar to the one of FIG. 6B or FIG. 6C. A CPC lens 203 is optically coupled to light guide unit 43, thereby defining a light source region 57. Assuming coupling to the light guide unit from opposite sides, at the light source regions, light from both sides will see the change in TIR-conditions (as a local break of the TIR condition because of a change in the geometry), thereby being extracted from light guide unit 43.

In FIG. 9A, two counter-propagating light portions 205 are indicated. Due to the fan concept, the light within light guide unit 43 can be understood as having propagation directions within an angular range 207 around an input light central direction 209. A tilt between input light central direction 209 and a central axis 211 of light guide unit 43 is indicated by an angle θ, giving in general the angle of input light central direction 209 with respect to the light guide unit plane (panel shape of light guide unit) or linearity (strip shape of light guide unit). In FIG. 9A, extracted light 213 is further indicated that similarly populates a limited range of directions with respect to the main front face 55A of light guide unit 43, the direction of light 213 is emphasized upwards as it would be for example the case after a first collimation optic (e.g. the embodiment of FIG. 6D).

In other words, the fan concept may allow providing a directionality to the extracted light such as a spread of propagation directions of the input light in ranges of ±10°, ±5°, ±4°, or ±2°. Moreover, one may vary input light central direction 209 with respect to the light guide unit essentially up to the TIR angle to optimize light extraction, e.g. by increasing the probability to interact with the extracting surface due to increased TIR interaction on the main front face and/or the main back face of the light guide unit (than it would take place for light propagating along the central axis).

Light propagation simulations were used to evaluate the extraction efficiency for a 1 mm×1 mm×61 cm PMMA light guide strip. Specifically, the light guide strip was at first assumed to receive light from LEDs via a coupling CPC lens (a coupling area of 0.8 mm×0.8 mm was considered to result in a wide range of light propagation directions within the light guide) distributed along the central axis, and to emit light at extractors extracting 100% of the incident light over an area with a diameter of 100 μm at a pitch of the extractors of 2.9 mm. Depending on the PMMA absorption of the light guide strip and the LED-re-absorption at the opposite side output coupling efficiencies larger than 50% were simulated in particular for realistic absorption values for the LED-re-absorption at the opposing sides of the light guide strip.

When considering the same parameters but provide for tilted propagation of a fan-like shaped input light distribution around an input light central direction of 42° (with respect to the strip direction) and a spread of ±5°, the light output may be increased significantly, to about for example 80% and more. It is noted that geometrical losses at the extrema of the light guide unit due to the tilted direction of the light injection may need to be considered, as discussed below.

Thus, the "tilted" propagation of an input light fan may in particular be advantageous when a refractive element is used for extraction as described above.

FIG. 9B and FIG. 9C illustrate the fan concept for a reflection mode configuration, that is, for example, similar to the one of FIG. 5B or FIG. 5C. Similar to FIG. 9A, counter-propagating light portions 205 may interact with both sides of a, for example symmetric, reflective element 215 that is used to redirect light of the TIR-conditions for light extraction.

In FIG. 9B, the use of an angular fan centered around the direction of central axis 211 is disclosed. Assuming reflection under 45°, extracted light 213 may be extracted essentially orthogonally to main front face 55A. An orthogonal extraction may simplify the design of the collimation optics. In addition, a narrow fan may provide for a reasonable pitch of the re-collimating lens because an effective collection of the extracted light may require smaller optics. The symmetric configuration with respect to counter-propagating light portions 205 further may simplify defining sun-like appearance of the light source regions/collimated light emitting regions as described in connection with FIGS. 10A to 10D.

In general, reflective extraction allows to enforce some directionality on the extracted light. This is in particular can be used with tilted fan configurations. Some aspects thereof are illustrated in FIG. 9C, For "tilted" propagation inside the guide, the use of reflective element for extraction may provide for a tilted output beam, while maintaining a steeper angle of incidence. As shown in FIG. 9C, an asymmetric reflective element 217 comprises two faces 219A, 219B. Assuming those faces extend symmetric with respect to main back face 55B, depending on their angle and the tilt angle, extracted light 213 will comprise divergent portions (as in FIG. 9A) or essentially parallel portions (as in FIG. 9B).

Providing differing inclination angles for faces 219A, 219B, a directionality of the sunlight-imitating beam formed by the extracted light 213 may be achieved. Having a tilted fan configuration may ensure thereby a steeper angle of incidence on face 219B than compared to a non-tilted fan configuration (indicated by face 219B' in FIG. 9C). Thus, the combination of a tilted fan configuration with inclined sun beam imitation may be performed under improved reflective conditions and shaping the extracted light profile.

Similarly, providing different tilting angles and fan ranges for the counter-propagating light portions 205 may be used to tune the system.

Light propagation simulations were used to evaluate for a 2 mm×2 mm×61 cm PMMA light guide strip the extraction efficiency for tilted angular fans of varying angular range and propagation direction. Specifically, the light guide strip was assumed to receive light from angles close to TIR angle at angular ranges of, for example, ±5°, ±4°, ±3°. For an assumed reflectivity at the ends of 98% and a series of 1 mm×1 mm square absorbers with 100% absorption at a distance (pitch) of about 3 mm, and extraction features as stated before, a light output of up to and more than 75% was calculated.

For completeness, it is noted that for a tilted angular fan situation, larger losses may occur at the opposite end of the light guide unit.

In several embodiments disclosed herein, down-converting elements such as phosphor compounds or quantum-dot structures are used to generate a wider spectrum. It is noted that the down-converting elements can be considered essentially as point sources for the respective collimating elements. A down-converting element can be configured as a white light emitter. However, not all emitted light may be used as some emission will partially go in the "wrong" direction. That lost emission may partially be guided to another extracting feature or be absorbed in a baffle structure.

In particular when provided with lateral super-white reflective material, phosphor compounds may act as mixing chambers having a lateral dimension and/or a thickness in the range from 5 μm to 300 μm such as 10 μm to 100 μm. Examples include YAG-phosphor plus binder or a monolayer of a granular phosphor compound e.g. attached to the PMMA material of a CPC lens by adhesive.

With respect to reflective extraction, light from within the light guide unit may be reflected into a CPC/lens or onto a down-converting element. As an example, reflective prisms may be formed on the main back side of the light guide unit, for example reaching into the light guide unit. Essential for the perception, the shape of the reflective elements should be designed in retrospective from the collimating element. For example, the shape may be round to be sun-like in appearance. Reflective structures may further be mirror coated to increase reflectivity or provide a focusing surface shape to direct more light, e.g., onto the down-converting element.

As indicated above, in a reflection mode configuration not employing any down-conversion, e.g. due to the use of broad white light primary sources, the shape of the reflecting surface may contribute to the appearance of the collimated light emitting face in the near field as well as in the far field. The inventors realized that in particular for a configuration of counter-propagating light within the light guide unit (as discussed for example in context with FIGS. 9A to 9C), a configuration of the extracting feature should consider this contribution specifically when using a respective light source for sunlight imitation.

In connection with FIGS. 10A to 10D, a respective shape of a reflective element is disclosed and simulations of the respective near field and far field distributions are discussed.

Figure 10A:
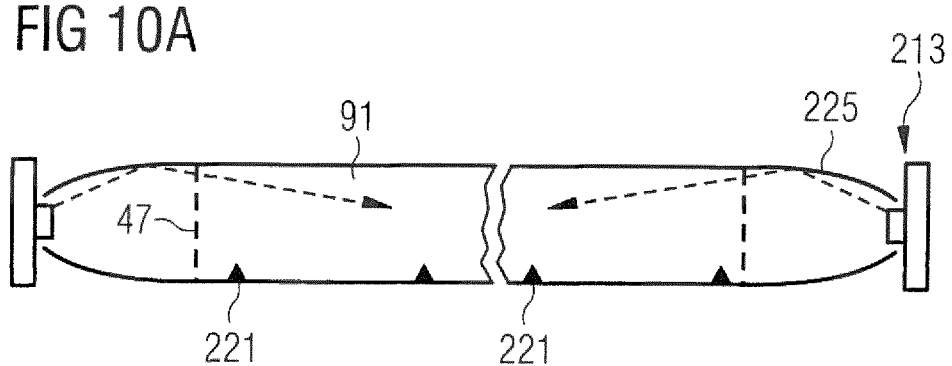
FIG. 10A to FIG. 10D illustrate an exemplary configuration with specifically shaped reflective extractors within, for example, a light guide strip.

Similar to the embodiments of FIGS. 5C and 5D, FIG. 10A illustrates exemplarily a light guide strip 91 having for light extraction provided on its main back face 55B a sequence of reflective prisms 221. Light guide strip 91 may have dimensions of 1 mm×1 mm×61 cm and receive light from LEDs 223 coupled to light guide strip 91 via CPC lenses 225 at respective lateral coupling faces 47.

Reflective prisms 221 may have a lateral size of 100 μm and slope angles of 45° to direct light components travelling parallel to light guide strip's central axis essentially in an orthogonal extraction direction 222A with respect to main front face 55A. The pitch between neighboring reflective prisms is, for example, 2.9 mm.

In the simulations, LEDs 223 are considered to be Lambertian emitters into CPC lens 225 and to be 80% reflectors (performing diffused reflection) when hit by (non-extracted and non-absorbed) light rays having passed through light guide strip 91.

Figure 10B:
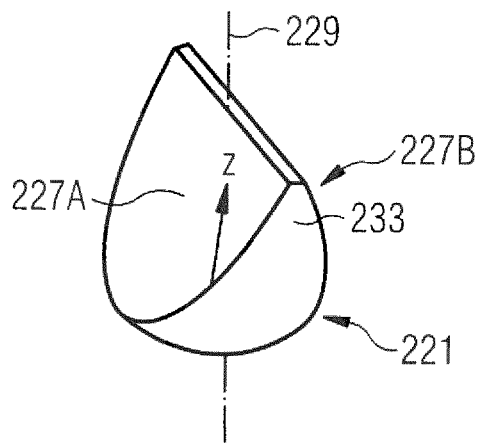

As illustrated in FIG. 10B, reflective prisms are reflectors that have a triangular cross section when looked at from the side and a round cross section when looked at from main front face 55A, i.e. from the respective collimating element. Accordingly, each reflecting side 227A, 227B of reflective prism 221 is shaped half-circle like such as a half-ellipse like face, thereby contributing to one half circle at the input side of the respective collimating element.

Examples for collimating elements have been described above and include re-collimating CPC and/or Fresnel lens combinations placed with their axes, for example, aligned to an axis 229 of reflective prism 221. Although various exemplary embodiments were disclosed in the context of CPC lens configurations, the skilled person will acknowledge those embodiments in which CPC lens configurations may be replaced by TIR lens configurations.

The shape of the angular distribution after the re-collimation lens depends on the shape of the extracting surfaces, as seen by the collimating element. As reflective prism 221 is "cut" so that in projection it exhibits a round shape, an almost round far field distribution 231B can be obtained after the re-collimation, as shown in FIG. 10D.

To reduce or even avoid light being deflected by curved lateral surfaces 233 of reflective prisms 221 to escape in the ambient and contribute to the light emitted from the light source, absorbers should be placed next to the faces of light guide strip 91 and surrounding the respective coupling CPCs.

Figure 10C:
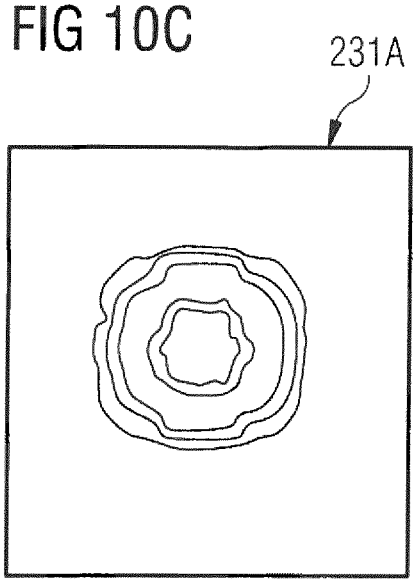
Figure 10D:
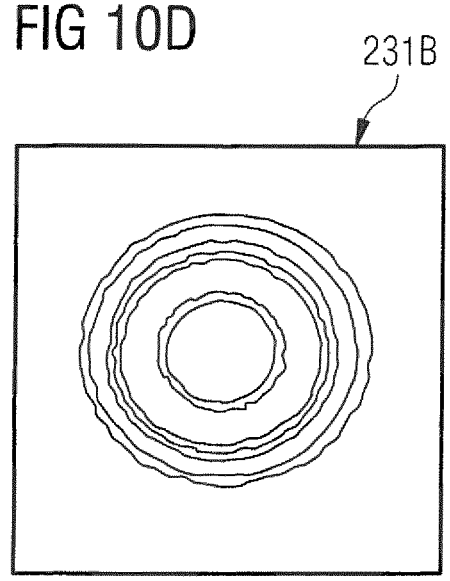

An exemplary near field distribution 231A of one single extraction feature is shown FIG. 10C based on gray scale intensity values. The size of the spot is of the order of 3 mm×3 mm. It fills almost completely the square "pixel". A modulation of the intensity within the pixel is, however, still present. Inside the 3 mm×3 mm pixel, there seem not to be any zones without light.

Downstream the first CPC, a secondary re-collimation lens, or a re-collimation lens alone obtains the desired narrow angle.

In FIG. 10D, far field 231B is shown after e.g. a Fresnel lens. Far field 231B is essentially round, even if it exhibits a "ring" modulation, which may be caused by a slight defocus of the extracting feature not being in the exact focal plane of the lens. Probably, if the luminance is high enough, the modulation may not be resolved because of the glare of the "sun" image.

According to simulations of the optical system, for the 61 cm×1 mm×1 mm light guide strip with 80% LED reflectance, with 0.7 mm LEDs sources coupled to the strip by CPCs, the output is simulated to be roughly 80% in the case of "square" prism reflectors (i.e. slightly less than for 0.8 mm LED sources coupled via CPCs). With the "round-when-seen-from-above" prism reflectors the output is similarly slightly lower than for the 0.8 mm sources condition.

Referring to the light source regions 57 and non-source regions 59 of main front face 55A, any unwanted flux from non-source region 59 may be about or less than 10%, such as about or less than 5% or such as 1% or less of the flux originating from a light source region (57).

The flux behavior may be measured just outside of the main front face of the light guide unit, i.e. at a surface (or even a virtual surface in the cases such as those using TIR frustration for light extraction) in front of the main front face and very close to it, e.g. at distances of e.g. 10 µm or less or even in contact with the main front face.

It is noted that the visibility of structures does not depend entirely on the flux magnitude. For example, also a quite weak light spot extremely concentrated at a certain angular range at large angle may result in a perceivable spot when looking at the luminaire and may generate a distortion of the sun imitations because a luminous white spot appears outside the "sun". Accordingly, the unwanted flux of non-source region 59 may not show highly localized spots or angularly localized spots. For example the variation of the unwanted flux may vary not more than resulting in local average flux densities of in average, e.g. 1% or less of the average flux of the light source regions.

Referring to configurations with down-converting elements, a proper alignment may be required as in particular it is essential to align down-conversion elements with respective collimating elements. For example, the down-conversion element may need to be positioned in the input side or within input side of a micro-CPC lens.

In general, the collimating unit may be a lens-array-structure, or a micro-lens-array structure and displaced large-lens-array structure, or a CPC-lens structure, or a short CPC-lens structure and displaced large-lens-array structure (herein also referred to as combined CPC-lens) or a TIR lens structure. In particular, the combined CPC-lens structure may reduce the thickness of the collimation unit. One may assume that the inlet side of a micro-CPC lens may act as a point source of light that is collimated to e.g. an output angle (external, full) of 30° with respect to a large secondary lens such as a Fresnel lens.

In some embodiments, a baffle structure may be positioned between (micro-) lenses or CPC lenses. The material for the collimating elements may be a PMMA structure having lateral air gaps between the neighboring PMMA structures. Lens, and generally optical element, structures and in particular CPC lens structures may be printed, e.g. printed CPC-array-structures or printed micro-CPC-array structures.

An input side of a CPC lens may be sized in the range from 10 µm to 200 µm in diameter such as 50 µm to 100 µm CPC entrance opening. An output side of a CPC lens, and a large lens in general, 0.5 mm to 10 mm such as 3 mm or 5 mm. Assuming an angular distribution at the input face of the CPC lens that does not completely fill the angular aperture of the CPC lens, holes may occur in the output far field. For example, a hole in a central zone may be generated due to missing normal incidence light on the light guide main front face.

In general, the focal length of the second large lens may be in the range of the thickness of the collimation unit, e.g. in the range from 5 mm to 100 mm such as 10 mm or 20 mm.

In some embodiments, the coupling of a CPC lens to the light guide unit may be a TIR frustration coupling or a glue connection. Prior contacting the CPC lens array and the light guide unit, the light guide unit may be provided with a black layer having larger than needed holes at the intended contact position. In that case, the input sides of the CPC lenses may define the sizes and positions and in general the light source regions.

In general, the collimation unit's collimating elements, and in particular the large lenses, may be configured to provide for a tilted light beam originating from a collimated light emitting region. For example, one may configure the second large lens as off-axis lens with respect to the extracting feature, or the first lens or (micro-) CPC, e.g. one may arrange the Fresnel lens off-axis. Such a misalignment between the extracting feature or the CPC and the Fresnel lens may result in a tilt of the collimated light beam in desired few degrees range with respect to propagation normal to the guide front face such as a tilt of about 15° with respect to the normal of the aperture of the luminaire.

It is noted that a homogenous emission corresponding to a homogenous luminance distribution over substantially the light emitting face is to be understood over an area range that depends, for example, on the observer distance, the type of structure and size of the collimated light emitting regions. In general, a homogenous emission may be achieved by arranging the collimated light emitting regions "as tight as possible", providing a light intensity within the light guide unit that is essentially constant, e.g. by coupling light into light guide strips from two sides etc., and coupling similar amounts of light into each collimating element. Moreover, the skilled person will understand that the light source regions may be provided substantially uniform e.g. in a substantially regular pattern such as a regular grid structure over the non-source region of the complete main front face. In some embodiment, the light source regions may be regularly provided in at least one dimension such as along a length along a light guide strip.

In some embodiments, the main front face may be split into several sections, and the light source regions may be provided substantially uniform e.g. in a substantially regular pattern with respect to the sections of the main front face. For example, sections may be due to mounting requirements and the transition between sections may be covered by a frame element. Similarly, multiple light sources may be combined and interact with a common or respective chromatic diffusing layer. For an architectural/mounting frame (e.g. white) separating those sections, the distance between the sections and thus their sizes dependent on the type of implementation and observer distance (the longer the distance the larger the minimum distance/size). For example, for indoor applications (not to large rooms), section sizes having a lateral extend in at least one direction may be in the range from 7 cm and larger, for example larger than about 20 cm. For large ambient installations, e.g. in large rooms or even at outdoor providing for example, 5 m to 10 m distances to the luminaire), section sizes having a lateral extend in at least one direction may be in the range from 10 cm and larger, for example larger than about 30 cm.

It is further noted that a small LED emitting surface size may reduce the need of an angular fan emission, however, efficiently coupling into the light guide may be more difficult for small LED emitting surface sizes.

Moreover, it is noted that homogenizing layers such as forward scattering layers or small-angle diffusers may be provided at the collimating unit at various positions. For example, providing a homogenizing layer at the input side of a CPC lens may result in a more homogeneous near field and far field; providing a homogenizing layer at the output side of a CPC lens, or at the second large lens layer or even upstream or downstream the chromatic diffusing layer may further smoothen the emitted light. Thereby, structural features as generated, for example, by the non-emitting areas of the light emitting face may be reduced or even avoided in the perception of the luminaire's aperture.

With respect to the aspect of coupling light from the primary light sources to the light guide unit, the embodiments disclosed herein exemplarily relate to edge-lit light guide units, in particular primary light is provided at a lateral coupling face connecting the main front face and the main back face in a thickness direction. However, the skilled person will recognize that alternative coupling configurations may use the main front face and/or the main back face. For example, one may use side-emitting LEDs, for example, for providing light into the light guide unit at a boarder range of the main front face or main back face.

With respect to the aspect of the light guide unit, the embodiments disclosed herein exemplarily relate to guiding the light by total internal reflection, in particular due to respective selection of refractive index configurations. However, the skilled person will recognize that alternative light guide configurations may be used that, for example, are based on reflective layers applied at least partially or section-wise on the light guide unit.

In the following various aspects are summarized. The skilled person will understand that feasible further developments and embodiments as disclosed herein, and exemplarily identified in the dependent claims, are respectively applicable to those aspects identified in the summary section as well as in the following.

(aspect) A light source for emitting collimated light in particular for an edge-lit large area luminaire, the light source comprising a light guide unit having a main front face, a main back face, and at least one lateral coupling face connecting the main front face and the main back face in a thickness direction, wherein
  the light guide unit is configured for guiding light received at the at least one lateral coupling face by total internal reflection between the main front face and the main back face,
  the main front face comprises a plurality of localized light source regions distributed over a non-source region at equal distances for having light pass there through, and
  the ratio of the area of the plurality of light source regions with respect to the area of the main front face (and/or: the area of the non-source region) is less or equal to 20% such as 16% or 15% or less or less or equal to 10% such as less or equal to a few percent such as less or equal to 5% such as less or equal to 2% such as less or equal to 0.2%;
a plurality of light emitting units for emitting light into the light guide unit through the at least one coupling face in the light emitting direction;
a collimation unit extending along the main front face and comprising a plurality of collimating elements optically coupled to the plurality of light source regions, wherein each collimating element is configured to receive light emerging from a respective light source region and to emit collimated light from a respective collimated light emitting region, the collimated light emitting regions forming a light emitting face of the light source.

(aspect) A light guide unit (43) comprising
a plurality of light guide strips (91), wherein the light guide strips define together, for the light guide unit, a main front face (55A), a main back face (55B), and at least one lateral coupling face (47) connecting the main front face (55A) and the main back face (55B) in a thickness direction ($d_T$), wherein each light guide strip (91) of the plurality of light guide strips (91)
  is configured for guiding light received at the at least one lateral coupling face (47) by total internal reflection, and
  comprises a plurality of localized light source regions (57) at the main front face (55A) for having light pass there through, wherein the light source regions (57) are provided along the light guide strip (91) within a non-source region (59).

(aspect) A light source—light guide unit comprising a light guide unit and
a plurality of light emitting units (41) (configured and arranged as disclosed herein) for emitting light into the light guide unit (91) through respective portions of the at least one coupling face (47).

Although the preferred embodiments of this invention have been described herein, improvements and modifications may be incorporated without departing from the scope of the following claims.

The invention claimed is:
1. A light source for emitting collimated light, the light source comprising:
  a light guide unit having a main front face, a main back face, and at least one lateral coupling face connecting the main front face and the main back face in a thickness direction, wherein
    the light guide unit is configured for guiding light received at the at least one lateral coupling face by total internal reflection between the main front face and the main back face, and the main front face comprises a plurality of localized light source regions for having light pass there through, wherein the light source regions are provided substantially uniformly distributed within and respectively surrounded by a non-source region, a plurality of light emitting units configured to emit light into the light guide unit through each of the at least one coupling face; and a collimation unit extending along the main front face and comprising a plurality of collimating elements, wherein each collimating element comprises an input side and an output side, is optically associated to one of the plurality of light source regions, and is configured to receive light emerging from the associated light source region at its input side, and to emit collimated light from a respective collimated light emitting region formed at its output side;

wherein the light source is configured to provide a light beam originating from each of the collimated light emitting regions that has a substantially round shape at a far field; and wherein the collimated light from the plurality of collimating elements forms a low-diverging light beam, having a full-width beam angle less than or equal to 5°.

2. A light source for emitting collimated light, the light source comprising:

a light guide unit having a main front face, a main back face, and at least one lateral coupling face connecting the main front face and the main back face in a thickness direction, wherein the light guide unit is configured for guiding light received at the at least one lateral coupling face by total internal reflection between the main front face and the main back face, and the main front face comprises a plurality of localized light source regions for having light pass there through, wherein the light source regions are provided substantially uniformly distributed within and respectively surrounded by a non-source region, a plurality of light emitting units configured to emit light into the light guide unit through each of the at least one coupling face;

a collimation unit extending along the main front face and comprising a plurality of collimating elements, wherein each collimating element comprises an input side and an output side, is optically associated to one of the plurality of light source regions, and is configured to receive light emerging from the associated light source region at its input side, and to emit collimated light from a respective collimated light emitting region formed at its output side; and a plurality of reflective structures, each reflective structure being associated with a light source region;

wherein the light source is configured to provide a light beam originating from each of the collimated light emitting regions that has a substantially round shape at a far field; and wherein a reflective structure of the plurality of reflective structures has a triangular cross section when looked at from the side and a round cross section when looked at from the respective collimating element and includes a planar reflecting side that has a shape of a half of an ellipse or of a half of a circle.

3. The light source of claim 2, wherein the plurality of collimating elements comprises a plurality of compound parabolic concentrators or TIR lenses having their input sides lined up at the side of the main front face at the positions of the light source regions.

4. The light source of claim 3, further comprising a plurality of down-conversion elements respectively associated with one of the plurality of compound parabolic concentrators or TIR lenses and positioned at the respective input sides, and wherein the plurality of compound parabolic concentrators or TIR lenses comprise respective dichroic reflective output sides reflective to the wavelength of the light emitted from the light emitting units.

5. The light source of claim 3, wherein the plurality of collimating elements comprises a plurality of secondary lenses respectively associated with the compound parabolic concentrators or TIR lenses.

6. The light source of claim 2, wherein the light source regions are provided in a substantially regular pattern or a regular grid structure over the non-source region in at least sections of the main front face, and/or wherein the regular grid structure is based on one or more types of grid units, each type of grid unit having an essentially identical dimension, and/or wherein a shape of a grid unit comprises points at equal distances.

7. The light source of claim 2, wherein the plurality of light source regions is distributed over the non-source region at equal distances.

8. The light source of claim 2, wherein the light guide unit comprises two opposite lateral light coupling faces each being associated with a subgroup of light emitting units of the plurality of light emitting units for coupling counter-propagating light into the light guide unit.

9. The light source of claim 2, wherein a continuous light emitting face is formed by the collimated light emitting regions, and the continuous light emitting face comprises non-emitting regions between the collimated light emitting regions, and the area ratio between the non-emitting regions and the collimated light emitting regions is essentially constant over the light emitting face of the light source.

10. The light source of claim 2, wherein the distance between neighboring light source regions is in the range from 0.5 mm to 50 mm, and/or wherein the light source is configured such that the flux of light emitted from the light source regions is at least 10 times or at least 20 times or at least 50 times as much as any leakage flux of light through the non-source regions.

11. The light source of claim 2, wherein the extension of the light guide unit in directions defined by the shape of the main front face is larger than the thickness of the light guide unit in the thickness direction.

12. The light source of claim 2, wherein the light guide unit comprises a plurality of light guide strips, each light guide strip comprising at least one lateral coupling face section optically coupled to at least one of the plurality of light emitting units, and a subgroup of the plurality of light source regions is arranged linearly along the light guide strip at equal distances, wherein the pitch between neighboring light source regions along the strip is in the range from 1 mm to 50 mm or about 3 mm, and/or wherein each light guide strip of the plurality of light guide strips has a rectangular cross-section with a thickness in the range from 0.1 mm to 5 mm, a lateral width in the range from 0.1 mm to 5 mm and a length in the range from 0.1 m to 2 m, and/or wherein each light guide strip of the plurality of light guide strips is mounted to a substrate at the respective side of each light guide strip that is associated with the main back face of the light guide unit.

13. The light source of claim 2, wherein the light source regions have a lateral extension in the range from 10 μm to 500 μm or about 100 μm, or
the light source regions have a lateral extension in the range up to 2 mm or up to 3 mm, and/or
the collimated light emitting regions have a lateral extension in the range from 0.5 mm to 50 mm, and/or
the thickness extension of the plurality of collimating elements is in the range from 1 mm to 0.3 m, and/or
the thickness extension of the light guide unit is in the range from 1 mm to 5 mm.

14. The light source of claim 2, further comprising
a cross-talk reducing baffle structure extending between and/or along collimating elements, thereby reducing the amount of light from a light source region entering a collimating element associated with a neighboring collimating element, and/or
a front leakage blocking structure extending between collimating elements along the main front face, and/or
a back leakage blocking structure extending along the main back face and configured as a heat sink.

15. The light source of claim 2, wherein at least one of the plurality of light emitting units comprises a light emitting device with a light emission over an angular range that results in an angular range within the light guide unit of below 40°, below 30°, below 20°, or about 10°, and/or
wherein the angular range-has an input light central direction and the input light central direction is inclined with respect to the normal to the main front face or main back face of light guide unit by an angle of (the angle of TIR+half of the angular range), and/or
wherein at least one of the plurality of light emitting units comprises a white light emission spectrum, and/or wherein the plurality of light emitting units comprises a variation of emission spectra.

16. The light source of claim 2, further comprising a plurality of down-conversion elements, wherein each down-conversion element is associated with a light source region and wherein:
a down-conversion element of the plurality of down-conversion elements is positioned to receive light having passed through the light source region, and/or
a down-conversion element of the plurality of down-conversion elements is positioned next to the main front face or the main back face to generate light from light having passed through a respective light source region of the plurality of light source regions or to generate light to pass through the light source region, and/or
a down-conversion element of the plurality of down-conversion elements is positioned at the input side of a respective collimating element of the collimation unit, and/or
a down-conversion element of the plurality of down-conversion elements is a disk-shaped phosphor compound material.

17. The light source of claim 2, further comprising a plurality of reflective structures respectively associated with a light source region and wherein:
a reflective structure of the plurality of reflective structures is positioned and configured to reflect light to pass through the light source region, and/or
a reflective structure of the plurality of reflective structures is positioned and configured to reflect light onto a respective down conversion element, and/or
a reflective structure of the plurality of reflective structures is configured as a focusing reflector.

18. The light source of claim 2, wherein:
a reflective structure of the plurality of reflective structures is positioned and configured to reflect light falling onto it from opposite directions to pass through the light source region in a similar extraction direction, and/or
a reflective structure of the plurality of reflective structures is configured as a reflective prism formed on the main back side, the reflective prisms extending in the thickness direction over 100 μm.

19. The light source of claim 2, wherein at least one of the plurality of collimating elements comprises a refractive optic, a reflective optic, one or more lenses, a TIR lens or a TIR lens followed by a lens or a Fresnel lens, a compound parabolic concentrator, or a compound parabolic concentrator followed by a lens or a Fresnel lens, and/or
wherein at least one of the plurality of collimating elements comprises a circular or polygon base shape aperture for the collimated light emitting region, and/or
wherein the collimating unit comprises a base structure configured to hold the collimating elements at respective positions and the base structure is configured as the baffle structure.

20. The light source of claim 2, further comprising a light emitting face formed by the collimated light emitting regions, and/or wherein the input side of a collimating element is optically associated to one of the plurality of light source regions.

21. The light source of claim 2, wherein at least one of the plurality of collimating elements is configured to provide at least one main light beam propagation axis for the propagation of the collimated light that is orthogonal to or inclined with respect to the light emitting face, and wherein all collimating elements are configured to provide for the same main direction and/or wherein an inclination of the collimated light is generated by a displacement of the optical axes of components of the collimating elements with respect to each other or with respect to the light source region.

22. The light source of claim 2, wherein
a light emitting face is formed by the collimated light emitting regions,
wherein the light emitting units are configured to emit primary light with a spectral distribution that compensates for spectral losses accumulated by the primary light while propagating within the light guide unit, and/or
wherein the light emitting units comprise subgroups configured to generate counter-propagating light within the light guide unit to compensate for losses accumulated by the primary light while propagating within the light guide unit and to provide for comparable light extraction at comparable light source regions such that the luminance per area section of the light emitting face is essentially homogeneous.

23. The light source of claim 2, wherein the light source, the collimation unit, and the collimating elements are configured to provide for a main light beam direction that is tilted with respect to the normal to a light emitting face of the light source.

24. The light source of claim 2, wherein the light source regions are aligned with a pitch in the range of about 3 mm to about 6 mm; and/or
wherein the light source regions have a circular shape or an elliptic shape or a disk shape.

25. The light source of claim 2, wherein the emitted collimated light of a respective one of the collimated light emitting regions provides a light beam emission having a circular beam cross-section in the far field that is due to at least one of:

the shape of a reflective element or a reflective surface extracting light from the light guide unit being designed in retrospective from the collimating element, an input size of a collimating element having a diameter in the range from 10 µm to 200 µm;

an entrance opening of a CPC lens or extracting lens having a diameter in the range of 50 µm to 100 µm;

a collimating element comprising a circular shaped aperture or a polygon base shaped aperture; and the collimating unit having one or more forward scattering layers and/or small-angle diffusers.

26. The light source of claim 2, wherein the light guide unit is configured to guide light from the light emitting units to extraction positions, each extraction position defining a localized light source region.

27. The light source of claim 2, wherein the far field is formed at a ceiling to floor distance; and/or wherein the far field of light beam originating from one of the collimated light emitting regions depends on a near field generated by a respective collimating element and the light received by the respective collimating element; and/or wherein a juxtaposition of collimated light emitting regions is perceived as a bright circular disk image, when looking at them from within the light beams originating from the juxtaposed collimated light emitting regions.

28. The light source of claim 2, wherein the light guide unit is panel shaped having a thickness in the range from 1 mm to 5 mm and a lateral extension in the range from 0.05 m to 3 m or in the range from 0.1 m to 2 m, and wherein the main front face and the main back face are opposite and essentially parallel to each other.

29. The light source of claim 2, wherein each collimating element is associated with a respective and only one light source region and each light source region is aligned with only one collimating element.

30. An edge-lit large area luminaire comprising
a light source of claim 2, and
a chromatic diffusing layer comprising a plurality of nanoparticles embedded in a matrix and configured to provide for a direct transmission that is larger in the red than in the blue and for a diffuse transmission that is larger in the blue than in the red, positioned to be illuminated by the collimated light or to be positioned downstream of the light source regions such as downstream of the input side and/or the output side of the collimation unit.

31. A light source for emitting collimated light, the light source comprising:

a light guide unit having a main front face, a main back face, and at least one lateral coupling face connecting the main front face and the main back face in a thickness direction, wherein the light guide unit is configured for guiding light received at the at least one lateral coupling face by total internal reflection between the main front face and the main back face, and the main front face comprises a plurality of localized light source regions for having light pass there through, wherein the light source regions are provided substantially uniformly distributed within and respectively surrounded by a non-source region, a plurality of light emitting units configured to emit light into the light guide unit through each of the at least one coupling face;

a collimation unit extending along the main front face and comprising a plurality of collimating elements, wherein each collimating element comprises an input side and an output side, is optically associated to one of the plurality of light source regions, and is configured to receive light emerging from the associated light source region at its input side, and to emit collimated light from a respective collimated light emitting region formed at its output side; and a cross-talk reducing baffle structure extending between and/or along collimating elements, thereby reducing the amount of light from a light source region entering a collimating element associated with a neighboring collimating element, wherein the cross-talk reducing baffle structure is a separate structure from the non-source region;

wherein the light source is configured to provide a light beam originating from each of the collimated light emitting regions that has a substantially round shape at a far field.

* * * * *